(12) United States Patent
Wang et al.

(10) Patent No.: US 9,076,337 B2
(45) Date of Patent: Jul. 7, 2015

(54) METHOD FOR DETERMINING TRAJECTORY OF MULTI-MOTOR CONTROL SYSTEM AVOIDING OBSTACLE

(71) Applicant: Mitsubishi Electric Research Laboratories, Inc., Cambridge, MA (US)

(72) Inventors: Yebin Wang, Acton, MA (US); Han Yu, Clifton Park, NY (US); Scott A. Bortoff, Brookline, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 105 days.

(21) Appl. No.: 14/031,175

(22) Filed: Sep. 19, 2013

(65) Prior Publication Data
US 2015/0081200 A1  Mar. 19, 2015

(51) Int. Cl.
*G06G 7/78* (2006.01)
*G08G 1/16* (2006.01)

(52) U.S. Cl.
CPC ........................................ *G08G 1/16* (2013.01)

(58) Field of Classification Search
CPC ....... B25J 9/1664; G01C 21/00; G01C 23/00; G05B 2219/40395; G05B 2219/40454; G05B 2219/40519
USPC ............ 701/25, 301, 408; 700/245, 250, 261, 700/262
See application file for complete search history.

(56) References Cited

U.S. PATENT DOCUMENTS

| | | | |
|---|---|---|---|
| 6,216,058 B1 * | 4/2001 | Hosek et al. | 700/245 |
| 7,248,952 B2 | 7/2007 | Ma et al. | |
| 2006/0184294 A1 * | 8/2006 | Ma et al. | 701/25 |
| 2013/0304379 A1 * | 11/2013 | Fulger et al. | 701/533 |

OTHER PUBLICATIONS

Hagenaars et al. "Approximate Continuous-time Optimal Control in Obstacle Avoidance by Time/Space Discretion of Non-convex State." Proceedings of the 2004 IEEE International Conference on Control Applications. p. 878-883Taipei, Taiwan, Sep. 2-4, 2004.
Mei et al. "Energy-Efficient Motion Planning for Mobile Robots." Robotics and Automation, 2004. Proceedings. ICRA '04. 2004 IEEE International Conference on.
Duleba et al. "Nonholonomic Motion Planning Based on Newton Algorithm with Energy Optimization." IEEE Transactions on Control Systems Technology, vol. 11, No. 3. p. 355-363. May 3, 2003.

* cited by examiner

*Primary Examiner* — Redhwan k Mawari
(74) *Attorney, Agent, or Firm* — Dirk Brinkman; Gene Vinokur

(57) ABSTRACT

The optimization of cost function representing a movement of the mass by the multi-motor control system from an initial point to a final point is subject to non-convex constraints due to avoidance of a region of the obstacle located between the initial point and the final point. Hence, the method determines a union of convex regions connecting the initial point with the final point, such that each convex region does not intersect the region of the obstacle, a convex constraint for each convex region and a set of switching times when the trajectory crosses boundaries of the convex regions. The method optimizes the cost function by jointly updating the positions and the set of switching times to produce an optimal trajectory of the movement. The optimizing is subject to the set of convex constraints applied independently for each corresponding convex region.

18 Claims, 20 Drawing Sheets

600

METHOD FOR DETERMINING TRAJECTORY OF MULTI-MOTOR CONTROL SYSTEM AVOIDING OBSTACLE

FIELD OF INVENTION

This invention relates generally to trajectory planning methods, and more particularly to methods for determining a trajectory for a motion of a multi-motor control system avoiding at least one obstacle.

BACKGROUND OF INVENTION

Planning of the motion of a multi-motor control system is generally performed in two steps: path planning and motion planning. Collision-free trajectory planning is typically solved by decomposing the problem into two steps. First, only the geometric aspects of the multi-motor control system, including the collision avoidance constraint, are considered to produce a collision-free path for the multi-motor control system to follow. Next, the planning, which ends up with a trajectory, accounts for other constraints, such as the constraints on system dynamics to specify how the multi-motor control system moves along the collision-free path. After the trajectory is determined, a speed profile can be assigned to the trajectory to determine the movement of a mass of the multi-motor control system. Such decomposition can be computationally efficient. However, that approach can fail to find a feasible trajectory when the geometric path is not properly generated. Also, this approach does not ensure an optimal trajectory.

The planning of an optimal trajectory of a multi-motor control system avoiding obstacles while minimizing energy consumption of the multi-motor control system is difficult. This is because the requirement of avoiding obstacles usually leads to a set of non-convex constraints and the optimization problem involving a continuous-time dynamical system and non-convex constraints is a difficult problem to solve.

Several conventional methods optimize energy efficiency during the path planning step by associating geometry, e.g., curvature of the trajectory with energy consumption, thus no dynamic constraints are considered. Some methods consider the energy-efficient path planning problem in terms of the friction and gravity, but assume the mass in the multi-motor control system moves at a constant speed. Results on the energy optimal motion planning are limited, and some methods focus on time-optimality and smoothness of the trajectory, see, e.g., U.S. Pat. No. 6,216,058.

The non-convex constraints due to obstacle avoidance need to be enforced during trajectory generation and optimization. Several conventional methods formulate the trajectory planning with obstacle avoidance as an optimization problem. For example, the method described in U.S. Pat. No. 7,248,952 formulates the trajectory planning as a mixed integer linear programming problem. However, the computation of a mixed integer problem is time consuming. Another method, described by Hagenaars et al, in "Approximate continuous-time optimal control in obstacle avoidance by time/space discretization of non-convex state constraints," Proc. of the 2004 IEEE Int. Conf. on Control Applications pp. 878-883, 2004, considers optimal control with obstacles by discretization of time and space. However, the cost function of the state and control variables is convex.

Some methods determine a suboptimal trajectory planning by minimizing influence of the non-convex constraints. For example, a method described by Duleha et al., in "Nonholonomic motion planning based on newton algorithm with energy optimization," IEEE Transactions on Control System Technology, Vol: 11(3), pp. 355-363, May 2003, considers energy efficient trajectory planning for non-holonomic systems without obstacles. Yet another method described by Mei et al., in "Energy-efficient motion planning for mobile robots," In Proc. of IEEE Int. Conf. on Robotics and Automation, pp. 4344-4349, 2004, considers the energy efficient motion planning for a mobile robot which has to visit several locations. The robot is assumed to move at certain pattern, thus simplifying the energy optimal trajectory planning problem by ignoring the dynamics of robots. However, all those methods do not take obstacles into account.

Accordingly, there is a need for optimization of a trajectory of a motion of a multi-motor control system avoiding at least one obstacle, wherein the optimization is subject to spatial non-convex constraints due to the obstacle.

SUMMARY OF INVENTION

One objective of some embodiments of the invention includes optimizing a trajectory for a multi-motor control system moving a mass, wherein the optimization of the cost function is subject to non-convex constraints due to avoidance of a region of the obstacle located between the initial point and the final point.

Representing of the movement of the mass as a cost function allows considering various types objectives of the operation of the multi-motor control system. For example, one embodiment determines the energy efficient trajectory for the movement of the mass. In addition to the various physical constraints including velocity, acceleration and obstacle to be avoided, this embodiment considers the energy consumption model of the multi-motor control system in the cost function. Thus, representing the movement of the mass as a cost function allows considering complex energy models, which can include, e.g., the electric and mechanical losses of the multi-motor control system.

However, the optimization of the cost function subject to non-convex constraints is a difficult problem to solve. Accordingly, some embodiments reduce the complexity of the optimization subject to non-convex constraints to an optimization over a set of convex constraints. Specifically, some embodiments are based on a realization that the non-convex constraint can be avoided by partitioning the non-convex admissible region into a union of convex regions, and introducing a set of switching times at which the trajectory crosses the borders of convex regions as additional decision variables. Thus, the embodiments transform an original optimal control problem into a mathematical optimization problem subject to non-convex constraints and reduce the complexity of the optimization subject to non-convex constraints to optimization over a set of convex constraints.

Accordingly, one embodiment discloses a method for determining a trajectory for a multi-motor control system moving a mass, wherein the trajectory includes positions of the mass as a function of time. The method includes determining a cost function representing a movement of the mass of the multi-motor control system from an initial point to a final point, wherein an optimization of the cost function is subject to non-convex constraints due to avoidance of a region of the obstacle located between the initial point and the final point; determining a union of convex regions connecting the initial point with the final point, each convex region does not intersect the region of the obstacle; determining a convex constraint for each convex region to produce a set of convex constraints; determining a set of switching times when the trajectory crosses boundaries of the convex regions; and optimizing the cost function by jointly updating the positions and the set of switching times to produce an optimal trajectory of the movement, wherein the optimizing is subject to the set of convex constraints, such that each convex constraint is applied independently for each corresponding convex region. The steps of the method are performed by a processor.

Another embodiment discloses a motion controller for controlling a multi-motor control system moving a mass according to a trajectory defining positions of the mass as a function of time from an initial point to a final point, such that the mass avoids at least one obstacle, wherein the multi-motor control system includes at least two motors for moving the mass into at least two directions. The controller includes a trajectory generator module for determining a union of convex regions connecting the initial point with the final point, each convex region does not intersect a region of the obstacle, and for optimizing a cost function representing a movement of the mass of the multi-motor control system subject to a set of convex constraints to determine the trajectory, wherein each convex constraint corresponds to a convex region of the union, and wherein the optimizing applies each convex constraint independently for each corresponding convex region; and a control module for generating a control signal to control the motors of the multi-motor control system according to the trajectory.

Another embodiment discloses a multi-motor control system for moving a mass according a trajectory. The system includes at least two motors for moving the mass into at least two directions; a motion controller for determining the trajectory defining positions of the mass as a function of time from an initial point to a final point, such that the mass avoids at least one obstacle, and an amplifier for providing energy to the motors according to the control signal.

The motion controller includes a trajectory generator module for determining a union of convex regions connecting the initial point with the final point, each convex region does not intersect a region of the obstacle, and for optimizing a cost function representing a movement of the mass of the multi-motor control system subject to a set of convex constraints to determine the trajectory, wherein each convex constraint corresponds to a convex region of the union, and wherein the optimizing applies each convex constraint independently for each corresponding convex region; and a control module for generating a control signal to control the motors of the multi-motor control system according to the trajectory.

DETAILED DESCRIPTION

Figure 1A:
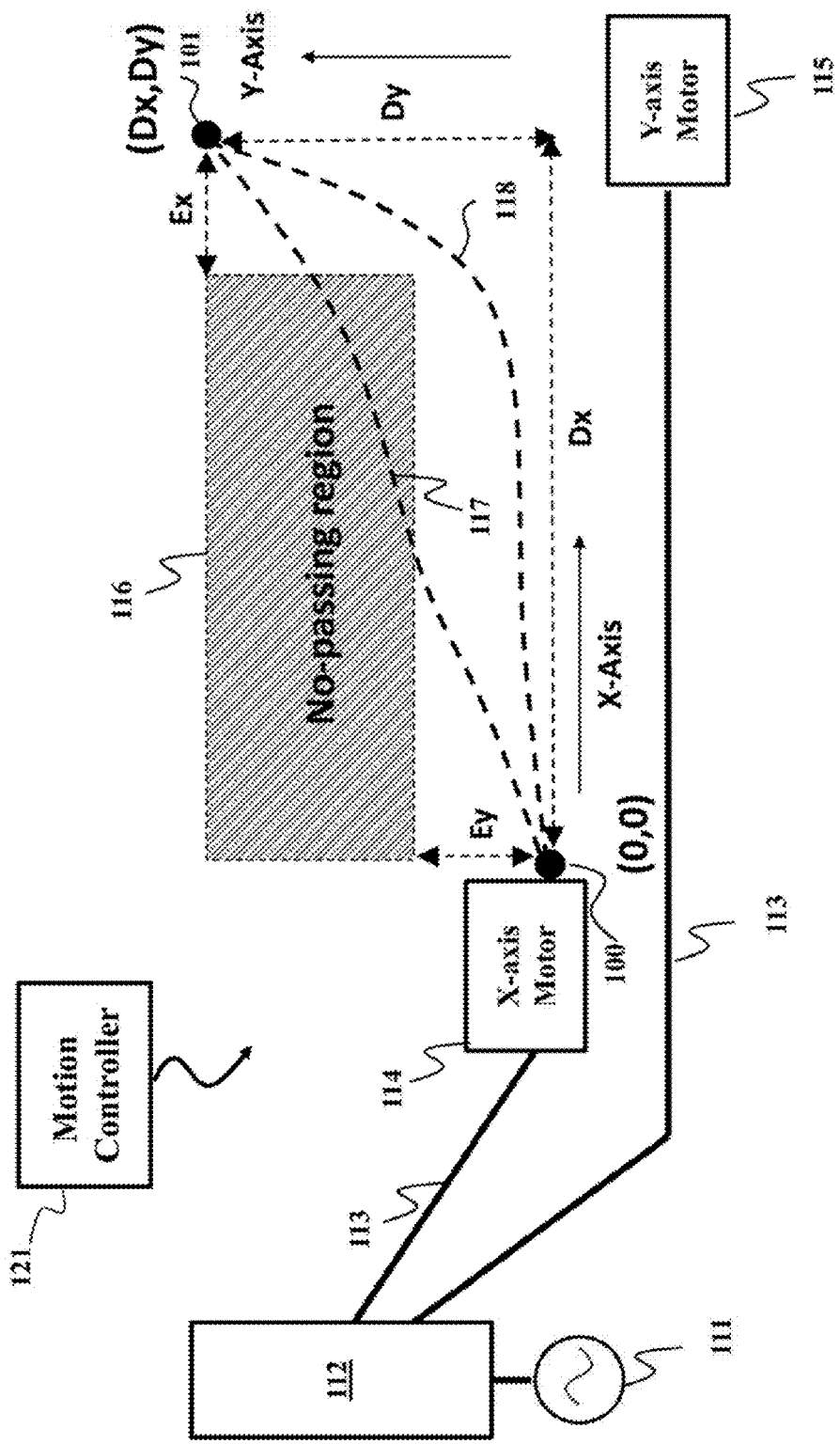
FIG. 1A is a schematic of a multi-motor control system moving from an initial location to a final location.

FIG. 1A shows a schematic of a multi-motor control system moving a mass from an initial location 100, with coordinates (0,0) in the 2D plane, to a final location 101, with coordinates (Dx, Dy) in the 2D plane. As used herein, multi-motor control system is any system having multiple motors for moving the mas into multiple directions, such as, X-Y stage system or an arm of a robot having multiple degrees of freedom. A power source 111 provides electrical energy to an amplifier 112. The amplifier provides electricity to actuators, e.g., servomotors 114 and 115, which move the mass in x and y axis respectively. The electricity from the amplifier to the servomotors is transferred through power line 113. An obstacle forms no-passing region 116 for the movement of the mass according to a trajectory that includes positions of the mass as a function of time.

For example, a trajectory 117 is not acceptable or feasible because by following the trajectory 117, the mass collides with the obstacle. On the other hand, a trajectory 108 is acceptable or feasible. Some embodiments of the invention describe a method for optimizing a trajectory of a movement of the mass avoiding at least one obstacle. The movement of the mass is controlled by a motion controller 121 connected to the motors 114 and 115 directly or through, e.g., the amplifier 112.

Figure 1B:
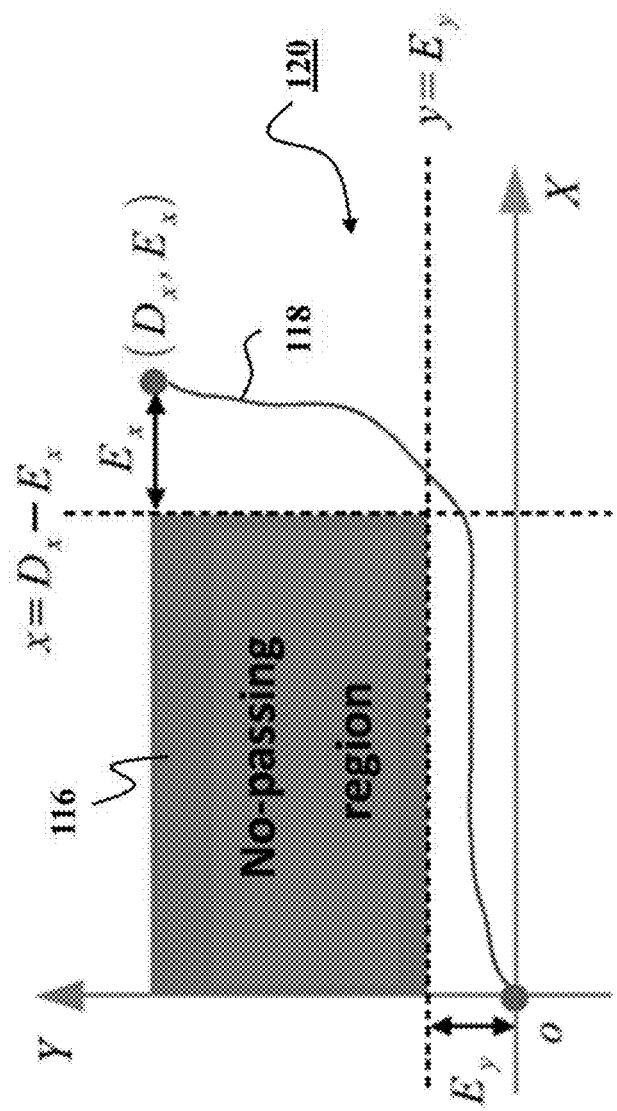
FIG. 1B is a schematic of a realization behind some embodiments of the invention.
Figure 1C:
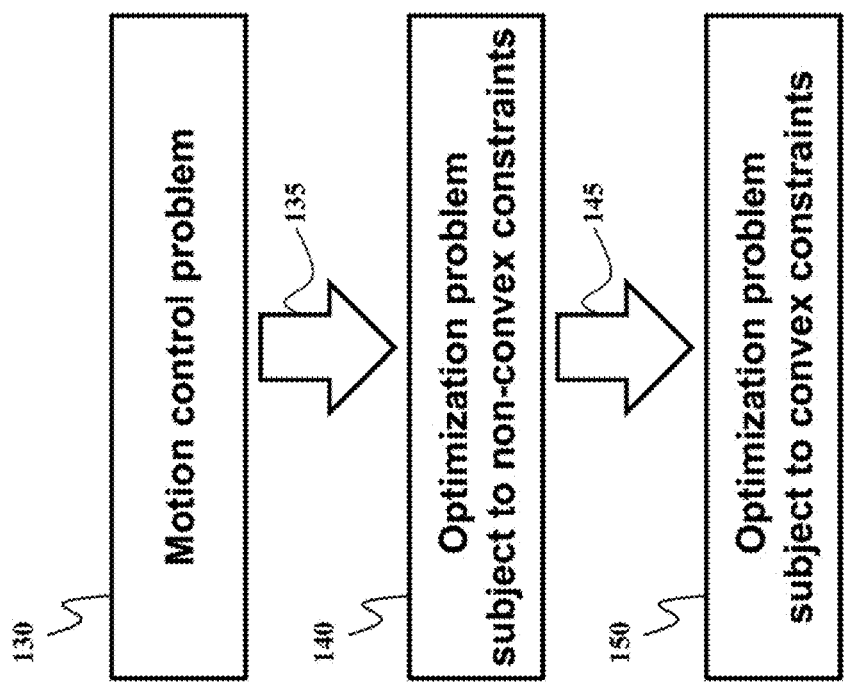
FIG. 1C is a block diagram of a method for optimizing a trajectory for a motion of a multi-motor control system according to some embodiments of the invention.

FIGS. 1B and 1C illustrate some principles used by various embodiments of the invention. In this example, the obstacles are defined by no-passing region 116, which in turn define, at least in part an admissible region a 120 for the movement of the mass. A trajectory 118 is an instance of collision-free trajectories. The trajectory 118 can be initialized using various techniques. The admissible region Ω for the mass, or the multi-motor control system, can be defined by parameters $(E_x, E_y, D_x, D_y)$. The admissible region Ω for the multi-motor control system can be represented by various constraints on the motion. The admissible region Ω is non-convex, thus the constraints are also non-convex.

FIG. 1C shows a block diagram of a method for optimizing a trajectory for a movement of the mass avoiding at least one obstacle according to one embodiment of the invention. Some embodiments of the invention transform 135 the motion control problem 130 of determining a trajectory, into a mathematical optimization problem 140 subject to the non-convex constraints due to the non-convex admissible region Ω. In some embodiments, the mathematical optimization problem takes control inputs to the motion controller as decision variables. In other embodiments, the mathematical optimization problem takes the state (position and velocity) of the mass as decision variables. In other words, the optimal trajectory for the mass to follow can be represented by various sets of decision variables. Some embodiments optimize a cost function representing the movement of the mass from a known initial point 100 to a known final point 101.

Representing of the movement of the mass as a cost function allows considering various types objectives of the operation of the multi-motor control system. For example, one embodiment determines the trajectory to improve energy efficiency of the multi-motor control system. In addition to the various physical constraints including velocity, acceleration and obstacle to be avoided, this embodiment considers the energy consumption model of the multi-motor control system as a cost function. Representing the movement of the mass as a cost function allows considering complex energy models, which can include, e.g., the electric and mechanical losses of the multi-motor control system.

However, the optimization of the cost function subject to non-convex constraints is a difficult problem to solve. Accordingly, some embodiments reduce 145 the complexity of the optimization 140 subject to non-convex constraints to an optimization 150 over a set of convex constraints. Specifically, some embodiments are based on a realization that the non-convex constraint can be avoided by partitioning the non-convex admissible region into a union of convex regions, and introducing, as additional decision variables, a set of switching times at which the trajectory crosses the borders of convex regions. Thus, the cost function can be optimized to produce an optimal trajectory of the multi-motor control system, which is represented by the decision variables such as optimal control inputs or the state of the multi-motor control system and the additional decision variables, i.e., a set of switching times when the optimal trajectory crosses the boundaries of the convex regions. Such optimization is subject to the convex constraints applied independently for each convex region selected based on the set of switching times.

Thus, the embodiments transform an original optimal control problem into a mathematical optimization problem subject to non-convex constraints and reduce the complexity of the optimization subject to non-convex constraints to optimization over a set of convex constraints. When the switching time is known and the cost function is convex, the optimal trajectory for the region is convex thus one solution can be uniquely determined by convex optimization programs. When the switching time is known and the cost function is non-convex, the optimization problem is subject to convex constraints and the computation is simplified versus solving the optimization problem subject to non-convex constraints. Thus, some embodiments initialize the set of switching times based on a feasible trajectory avoiding the obstacle.

Figure 1D:
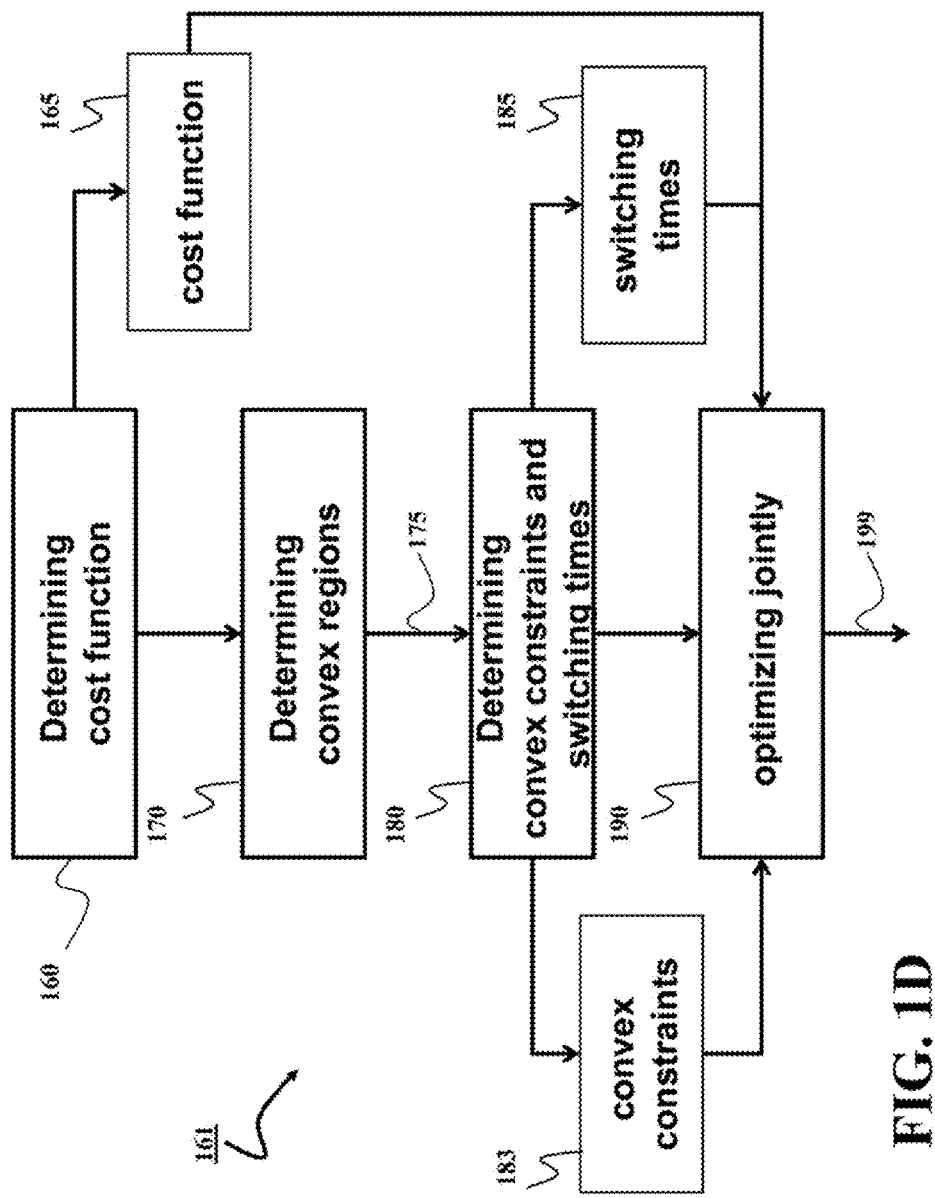
FIG. 1D is a block diagram of a method for optimizing a trajectory for a motion of a multi-motor control system avoiding at least one obstacle according to one embodiment of the invention.

FIG. 1D shows a block diagram of a method for determining a trajectory for a multi-motor control system moving a mass according to one embodiment of the invention. The trajectory includes positions of the mass as a function of time. The steps of the method are performed by a processor 161.

The embodiment determines 160 a cost function 165 representing the movement of the mass of the multi-motor control system from an initial point to a final point. The optimization of the cost function is subject to non-convex constraints due to avoidance of a region of the obstacle located between the initial and the final point.

The embodiment determines 170 a union of convex regions 175 connecting the initial point with the final point. Each convex region does not intersect the region of the obstacle. The embodiment also determines 180 convex constraints for each convex region to produce a set of convex constraints 183 and determines 180 a set of switching times 185 when the trajectory crosses boundaries of the convex regions. Examples of determines convex regions and their convex constraints are provided below.

Next, the embodiment optimizes 190 the cost function 165 by jointly selecting the position as the decision variables and the set of switching times as the additional decision variables to produce an optimal trajectory 199 for the movement of the mass. The optimizing is subject to the convex constraints 183 applied independently for each convex region selected based on the set of switching times.

Figure 1E:
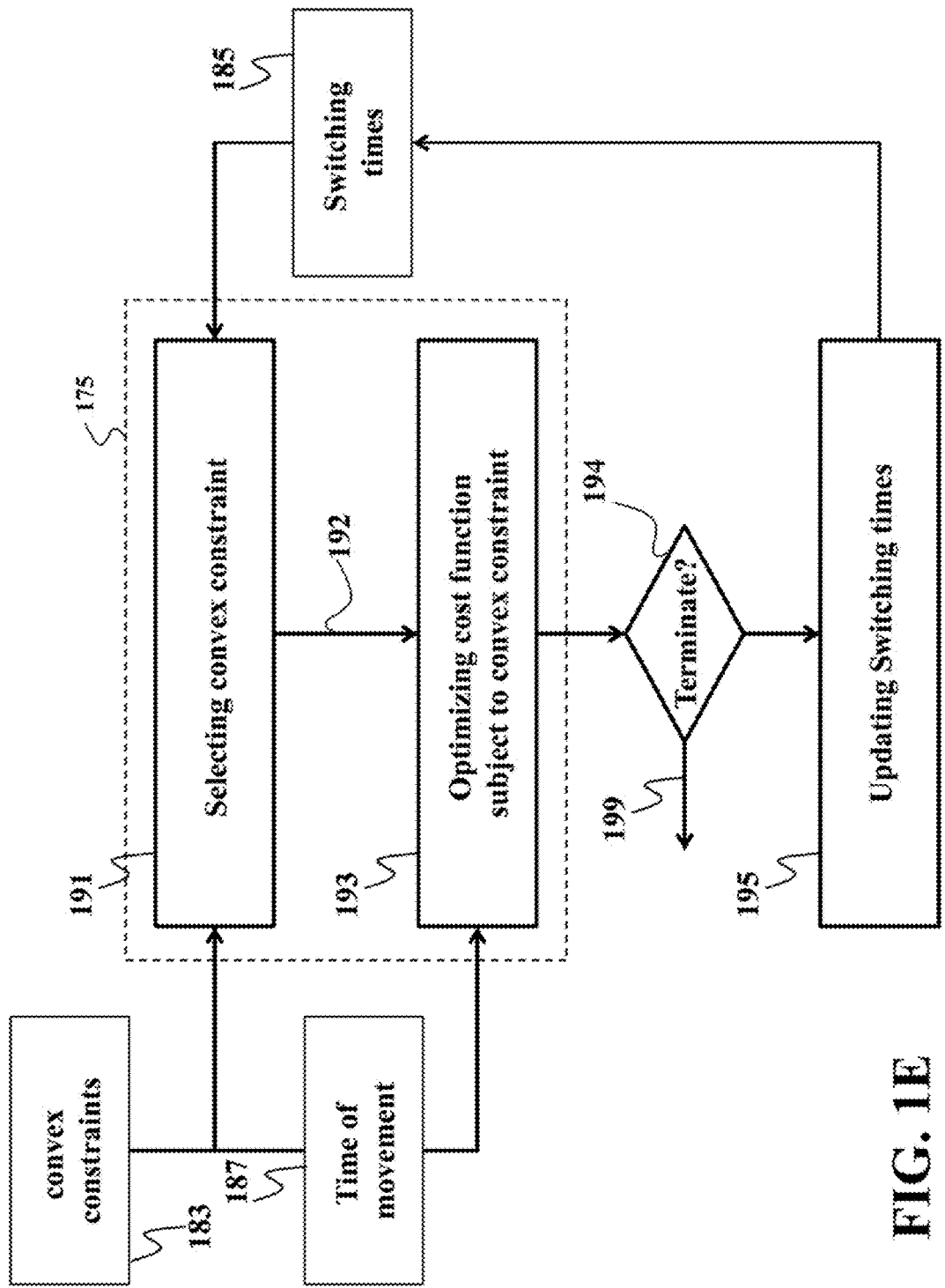
FIG. 1E is a block diagram of an exemplary method for optimizing the cost function according to one embodiment of the invention.

FIG. 1E shows a block diagram of an exemplary method for optimizing the cost function. The optimizing includes selecting 191 the convex constraint 192 of the convex region from the set of convex constraints 183 based on a time 187 of the movement and the set of switching times 185. Next, for the time of the movement defined by the switching times of the convex region, the cost function is optimized 193 subject to the convex constraint 192 of the convex region.

For example, the union of convex regions includes a first convex region and a second convex region, and a switching time corresponds to a time when the trajectory crosses a boundary between the first and the second convex regions. Then, a convex constraint of the first convex region is applied during a period of time the trajectory is within the first convex region, and a convex constraint of the second convex region is applied during a period of time the trajectory is within the second convex region.

The selecting and optimizing steps are performed for each convex region in the union 175. If the termination condition 194 is not met, the set of the switching times is updated 195. In such manner, the selecting, the optimizing and the updating are repeated until a terminal condition 194 is met to produce the trajectory 199.

In some embodiments, the processor 161 is at least a part of a motion controller for controlling a motion of a multi-motor control system avoiding at least one obstacle according to the optimal trajectory 199. The motion controller can be implemented in a number of different ways. For example, in one embodiment, the motion controller is implemented as a controller 611 shown in FIG. 6A and described below.

In exemplar embodiment of the invention, the multi-motor control system, driven by two electric motors in x- and y-axis, moves in a two dimension (2D) plane, and the dynamics of the multi-motor control system is described by the following forth-order linear time-invariant (LTI) control system $$\begin{cases} \dot{x}_1 = x_2 \\ \dot{x}_2 = d_x x_2 + b_x u_x \\ \dot{y}_1 = y_2 \\ \dot{y}_2 = d_y y_2 + b_y u_y \end{cases} \quad (1)$$

where $x_1$ denotes the position and $x_2$ denotes the velocity of the multi-motor control system in the x-axis, while $y_1$ denotes the position and $y_2$ denotes the velocity of the multi-motor control system in the y-axis, $d_x, d_y$ are the viscous friction due to the movements of the multi-motor control system in x-axis and y-axis respectively, b is a constant coefficient, a single dot indicates the first derivative, $u_x, u_y$ are the control inputs to actuators of the multi-motor control system, for instance electric motors, in x-axis and y-axis respectively, and a single dot indicates the first derivative. Equivalently, $x_1$ can denote the angular position and $x_2$ denote the angular velocity of the electric motor driving the motor to move in the x-axis, while $y_1$ can denote the angular position and $y_2$ denote the angular velocity of the electric motor driving the multi-motor control system to move in the y-axis. The embodiment of the control input $u_x, u_y$ to the electric motor includes current or voltage. Denoting $X=[x_1,x_2,y_1,y_2]^T$ as the state of the robot and $U=[u_x, u_y]^T$ as the control input, the dynamics given in (1) can be written as follows $$\dot{X} = \begin{pmatrix} 0 & 1 & 0 & 0 \\ 0 & d_x & 0 & 0 \\ 0 & 0 & 0 & 1 \\ 0 & 0 & 0 & d_y \end{pmatrix} X + \begin{pmatrix} 0 & 0 \\ b_x & 0 \\ 0 & 0 \\ 0 & b_y \end{pmatrix} U = AX + BU. \quad (2)$$

One embodiment of this invention considers to solve the following trajectory planning problem:

Given the final arrival time $t_f$, design the trajectory X from Position A ($X_0=[0,0,0,0]^T$) to Position B ($X_f=[D_x,0,D_y,0]^T$) with minimal cost while avoiding the keep-out area shown in FIG. 1, where the cost function is given by $$J=\int_0^{t_f}(R_x u_x^2+R_y u_y^2+K_x x_2 u_x+K_y y_2 u_y)dt, \quad (3)$$

with velocity and acceleration constraints given by $$0 \le x_2 \le v_{max}^x, 0 \le y_2 \le v_{max}^y, |\dot{x}_2| \le a_{max}^x, |\dot{y}_2| \le a_{max}^y, \quad (4)$$

and the control input constraints are given by $$|u_x| \le u_{max}, |u_y| \le u_{max}. \quad (5)$$

where $|D_x, D_y, v_{max}^x, v_{max}^y, a_{max}^x, a_{max}^y, u_{max}$ are known constants, $R_x, R_y$ are the resistances of windings of the motors and are usually supplied by a manufacture of the motor, and $K_x, K_y$ are the torque constants of the motors.

The torque constant is usually supplied by the manufacturer of the motor or can be established from the specifications of the motor.

Transforming Non-Convex Constraints

Figure 2A:
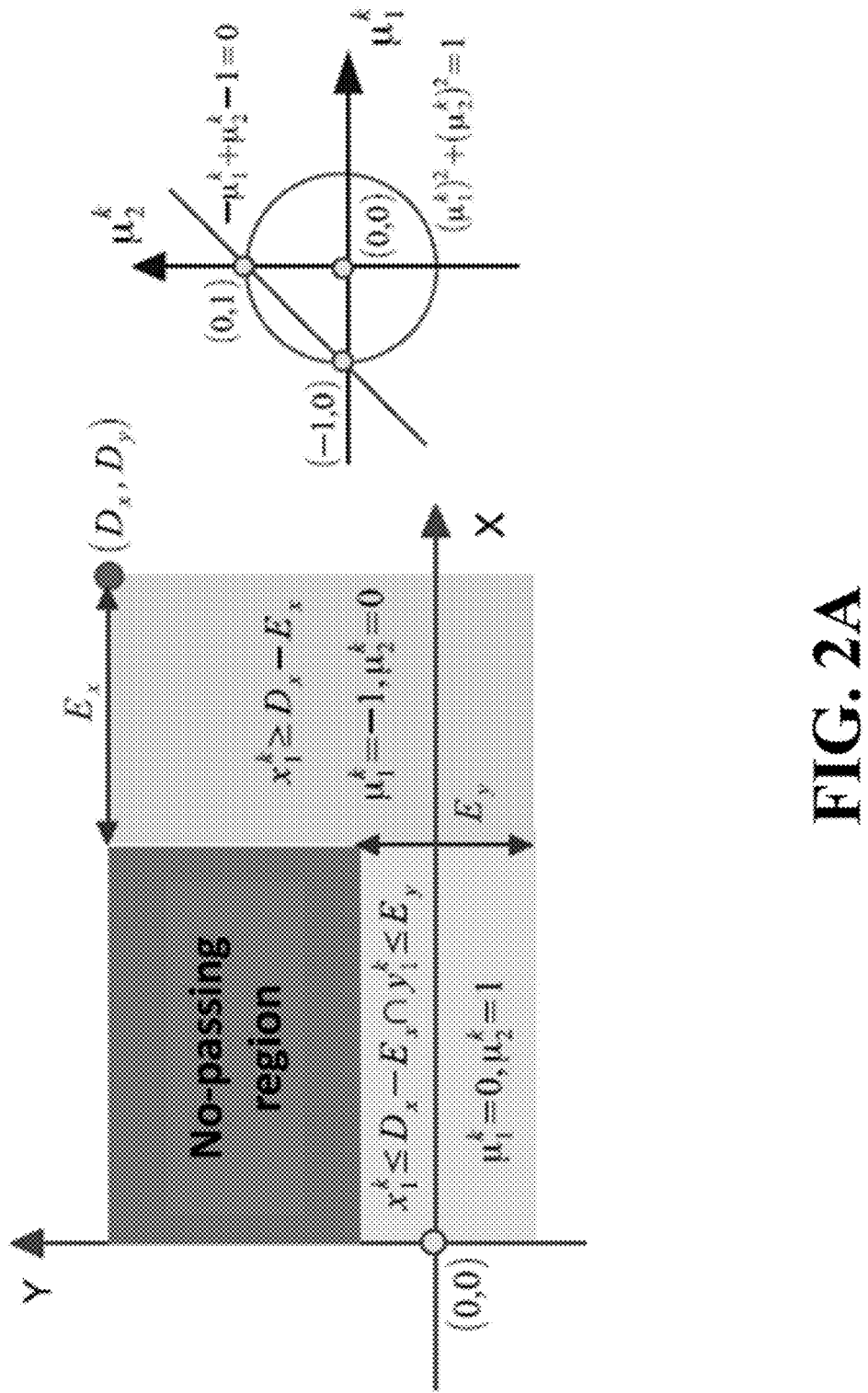
FIGS. 2A and 2B are schematics of parameterization of the constraints due to avoidance of a region of the obstacle located between the initial location and the final location.
Figure 2B:
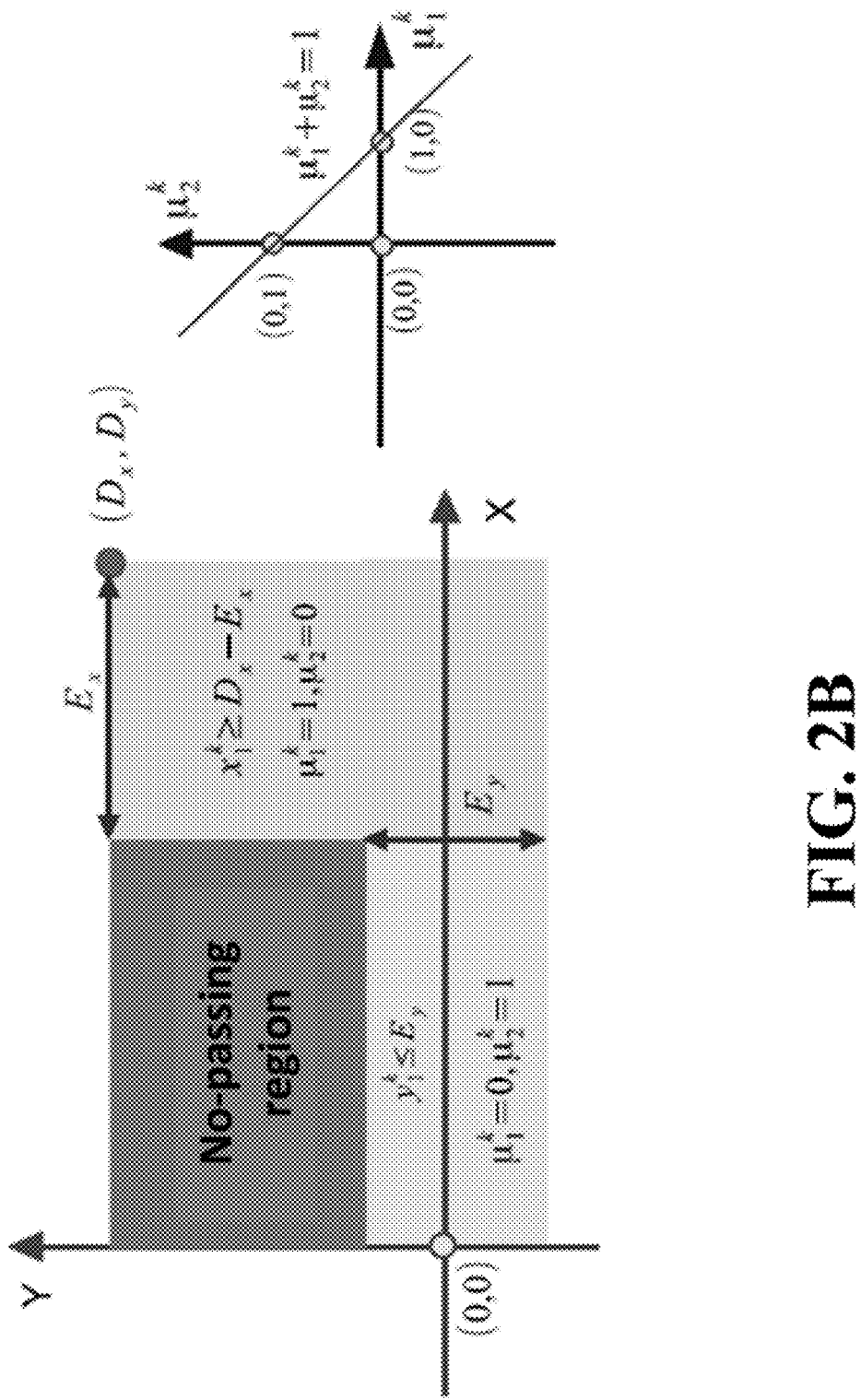

FIGS. 2A and 2B are schematics of transforming of the non-convex constraints due to avoidance of a region of the obstacle located between the initial location and the final location. One embodiment partitions the entire time $t_f$ of the movement of the mass into a certain number of time steps (for instance N steps discretization of time yields $t_0=0, t_1, \ldots, t_N=t_f$), and at every time step k the position $(x_1, y_1)$ of the mass, or the multi-motor control system, lies in the admissible region. This obstacle avoidance constraint can be formulated as:

$$x_1^k \ge D_x - E_x \text{ or } y_1^k \le E_y, \quad (6)$$

where $(x_1^k, y_1^k)$ denotes the position of the multi-motor control system at the k-th time step. One embodiment transforms the or-constraint into a more useful and-constraint is to introduce binary slack variables. Let $\mu_i^k$ (i=1,2) be a binary variable (0 or 1) at the k-th time step and let M be an arbitrary large positive number. The constraint (6) may then be replaced by the following mixed-integer/linear constraints:

$$-x_1^k \le -(D_x-E_x)+M\mu_1^k,$$

$$\text{and } y_1^k \le E_y + M\mu_2^k,$$

$$\text{and } \mu_1^k+\mu_2^k \le 1, \mu_1^k, \mu_2^k \in \{0,1\}, \quad (7)$$

The last and-constraint ensures that at least one of the original or-constraints is satisfied, which ensures that the multi-motor control system avoids the obstacle. After transforming the or-constraints into mixed-integer/linear constraints, the combination of the original optimal control problem with the binary constraints for collision avoidance (7) yields a large mixed integer programming (MIP) problem, which is difficult or computationally inefficient to solve.

There are other ways to formulate the binary constraints for obstacle avoidance similar to the one shown in (7), for example, the constraint (6) can also be formulated as $$\mu_1^k(x_1^k-D_x+E_x)+\mu_2^k(y_1^k-E_y) \le 0$$

$$(\mu_1^k)^2+(\mu_2^k)^2-1=0$$

$$-\mu_1^k+\mu_2^k-1=0 \quad (8)$$

where the last two equations in (8) ensures that $(\mu_1^k, \mu_2^k)$ can only take two solutions: $(-1,0)$ and $(0,1)$, as shown in FIG. 2A. The mixed-integer/linear constraints in (7) is transformed into nonlinear constraints (8) due to the binary characterization of the parameters $(\mu_1^k, \mu_2^k)$.

This kind of parameterizations of non-convex constraints is not unique, for example, another alternative parameterization could be $$\mu_1^k(D_x-E_x-x_1^k)+\mu_2^k(y_1^k-E_y) \le 0$$

$$\mu_1^k\mu_2^k=0$$

$$\mu_1^k+\mu_2^k-1=0 \quad (9)$$

where the last two equations in (9) ensures that $(\mu_1^k, \mu_2^k)$ can only take two solutions: $(1,0)$ and $(0,1)$, as shown in FIG. 2B.

The combination of the original optimal control problem with the smooth nonlinear constraints for collision avoidance (8) or (9) yields a large non-convex nonlinear programming (NLP) problem, which is difficult to solve.

Figure 3A:
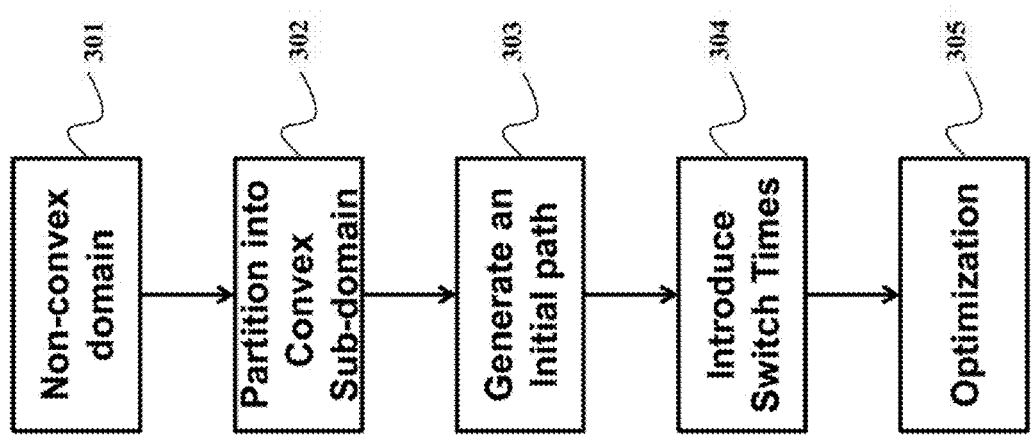
FIG. 3A is a block diagram of a method for optimizing a trajectory for a motion of a multi-motor control system avoiding at least one obstacle according to one embodiment of the invention.

FIG. 3A shows a block diagram of a method for determining a trajectory for a motion of a multi-motor control system according to one embodiment of the invention. Due to presence of obstacles, the admissible region where the trajectory of the mobile multi-motor control system can lie in is in generally non-convex. Starting with the non-convex admissible domain 301, the embodiment first partitions the non-convex domain as a union of a number of convex cub-domain 302. There are multiple partition schemes. One embodiment selects a partition scheme minimizing the number of sub-domains. The block 303 generates an initial path which satisfies the collision-avoidance constraints. Combining with the initial path and the union of convex sub-domain, block 304 introduces additional decision variables: switching times when a sub-optimal trajectory crosses the boundary of each convex sub-domain with which the initial path intersects. Given the introduced switching times as extra decision variables to the original optimal control problem, the embodiments reformulate a new augmented optimal control problem to be solved. In one embodiment, block 305 uses an optimization-based method to solve the augmented optimal control problem.

Figure 3B:
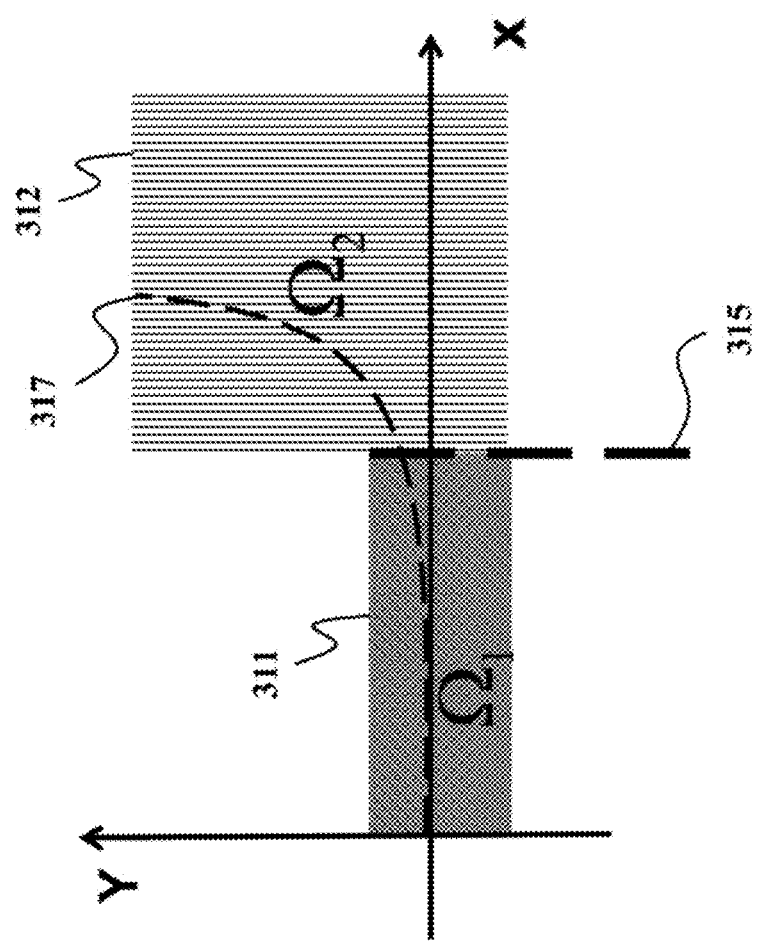
FIGS. 3B-3C are examples of partitioning the non-convex region into a union of convex regions according some embodiments of the invention.
Figure 3C:
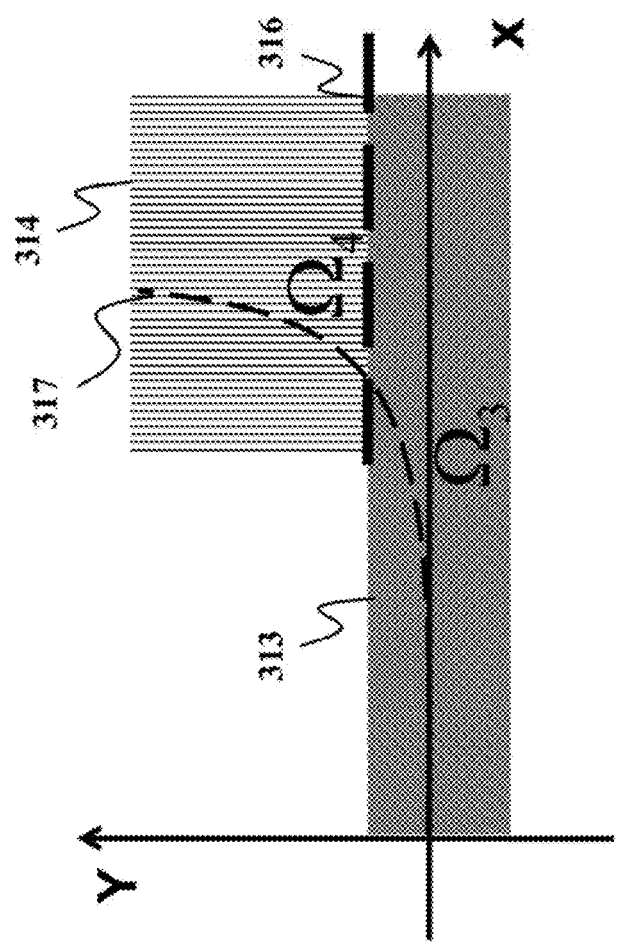

FIGS. 3B and 3C show examples of partitioning the non-convex region into a union of convex regions. In one embodiment as shown in FIG. 3B, the non-convex region is partitioned as a union of two convex sub-regions 311 and 312. In another embodiment as shown in FIG. 3C, the non-convex region is partitioned as a union of two convex sub-d regions 313 and 314.

Given an initial path 317 and the partition scheme given in FIG. 3B, a switch time $t_{s1}$ representing the time when the sub-optimal trajectory crosses a line 315 is introduced. On the other hand, given an initial path 317 and the partition scheme given in FIG. 3C, a switch time $t_{s2}$ representing the time when the sub-optimal trajectory crosses a line 316 is introduced. For teaching purpose, we denote a switch time as $t_s$ for the exemplary application to simplify notation.

After introducing the switching time instant $t_s$, the non-convex admissible region for the multi-motor control system becomes two convex sub-regions $y_1 \leq E_y$ (for $0 \leq t < t_s$) and $x_1 \geq D_x - E_x$ (for $t_s \leq t < t_f$), the original optimal control problem now becomes the optimal control problem in two admissible regions (10) and (11), with switching time instant $t_s$.

The optimal trajectory actually switches between two admissible regions according to $$\text{Region 1:} \begin{cases} 0 \leq x_2 \leq v_{max}^x, 0 \leq y_2 \leq v_{max}^y, \\ |\dot{x}_2| \leq a_{max}^x, |\dot{y}_2| \leq a_{max}^y, \\ |u_x| \leq u_{max}, |u_y| \leq u_{max} \\ \dot{X} = AX + BU, X(0) = X_0 \\ y_1 \leq E_y, 0 \leq t < t_x \end{cases} \quad (10)$$

$$\text{Region 2:} \begin{cases} 0 \leq x_2 \leq v_{max}^x, 0 \leq y_2 \leq v_{max}^y, \\ |\dot{x}_2| \leq a_{max}^x, |\dot{y}_2| \leq a_{max}^y, \\ |u_x| \leq u_{max}, |u_y| \leq u_{max} \\ \dot{X} = AX + BU, X(t_s^+) = X(t_s^-), X(t_f) = X_f \\ x_1 \geq D_x - E_x, t_x \leq t < t_f \end{cases} \quad (11)$$

where $t_s$ denotes the time instant at which the optimal trajectory switches from region 1 (either 311 or 313) to region 2 (either 312 or 314). In various embodiments, the optimizing is subject to the convex constraints applied independently for each convex region selected based on the set of switching times, i.e., the time instant when a trajectory enters from region 1 into region 2.

The augmented optimal control problem is: Given the system (1) and the final time $t_f$, find the optimal control input U* and the optimal switching time $t^*_s$ such that the corresponding continuous state trajectory X departing from a given initial state $X(t_0)=X_0$ meets all the constraints in Region 1 and Region 2 respectively and arrives $X_f$ at time $t_f$, while the cost function J (see (3)) is minimized.

Time-Space Decomposition

Some embodiments solve augmented optimal control problem using two stages. Stage 1 solves a first sub-problem that determines a minimal value of the cost function J with respect to the decision variables: control input U under a given switching time $t_s$. The corresponding optimal cost function is denoted as $J(t_s)$. Stage 2 minimizes the cost function $J(t_s)$ with respect to the additional decision variable: switch times $t_s$ (i.e., $\min_{t_s} J(t_s)$, subject to $0 < t_s < t_f$), which is a second sub-problem.

Some embodiments use the following conceptual steps to optimize the trajectory.

1. Set the iteration index $j=0$, choose an initial $t_s^j$.
2. By solving an optimal control problem (i.e., Stage 1), calculate $J(t_s^j)$.
3. Calculate $$\left. \frac{\partial J}{\partial t_s} \right|_{t_s^j}.$$

4. Use some feasible direction method to update $t_s^j$ to be $t_s^{j+1} = t_s^j + \alpha^j dt_s^j$ (here $dt_s^j$ is formed by using the gradient information of J with respect to $t_s$; the step size $\alpha^j$ can be chosen using some step size rule). Set the iteration index $j=j+1$.
5. Repeat step 2)-4) until a prescribed termination condition is satisfied.

Figure 4:
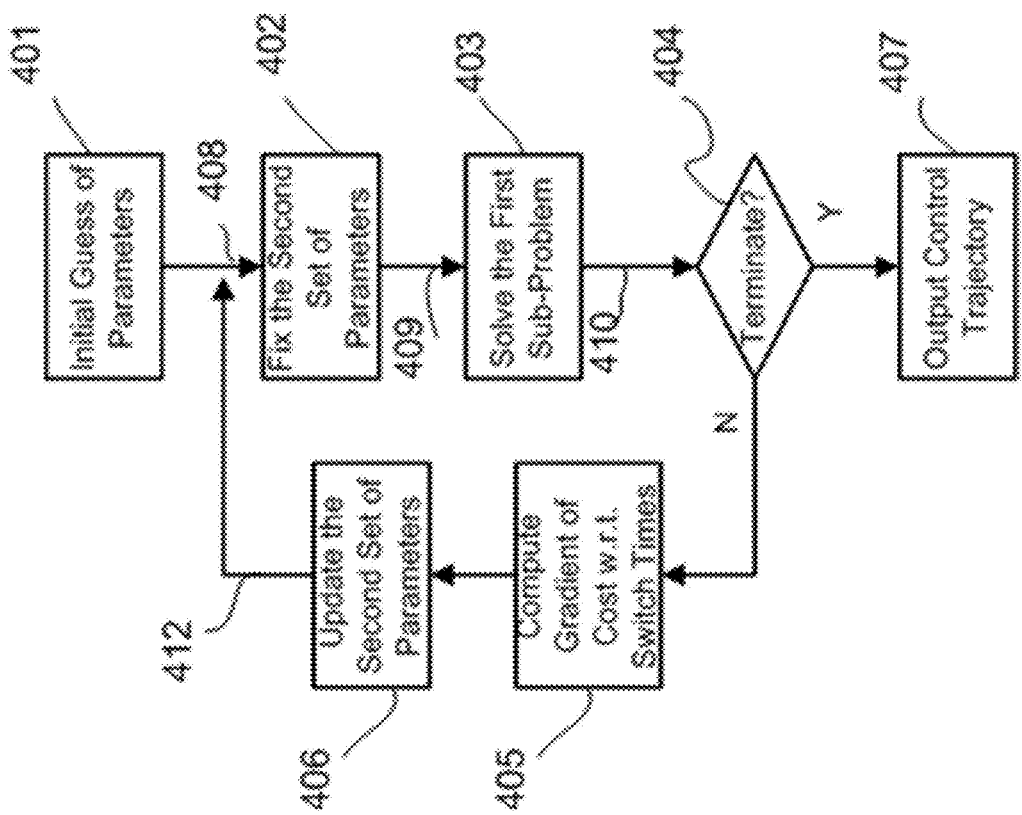
FIG. 4 is a block diagram of a method for optimizing a cost function using decomposition of decision variables according to some embodiments of the invention.

FIG. 4 shows a block diagram of the method according to one embodiment. Given an initial guess of parameters or decision variables 401, block 402 first fixes a second set of parameters, switching times, and solve a first sub-problem in 403. The block 403 generates a solution of the first sub-problem as an output to the block 404, which checks termination criteria. If the termination criteria are not satisfied, the blocks 405 and 406 solve the second sub-problem by fixing the first set of parameters, and update the second set of parameters. In one embodiment, the block 405 computes the gradient of the cost function $J(t_s)$ with respect to the second set of parameters t, as $$\frac{\partial J}{\partial t_s},$$

and the block 406 adjusts the second set of parameters. If the termination criteria are satisfied, a block 407 output the trajectory.

In order to solve the first sub-problem in Stage 1, some embodiments use nonlinear optimization techniques. Except for very few classes of problems, analytical expressions of $J(t_s)$ are difficult to obtain. This is evident from the fact that very few classes of conventional optimal control problems possess analytical solutions. The unavailability of analytical expressions of $J(t_s)$ henceforth makes the optimization in Stage 2 difficult to carry out. However, even without the expressions of $J(t_s)$, some embodiments determine the values of the derivatives $$\frac{\partial J}{\partial t_s},$$

and determine the solution at stage 2 by employing optimization techniques.

One embodiment transforms the augmented optimal control problem into an equivalent problem parameterized by the unknown switching times. The embodiment introduces a variable z which corresponds to the switching time $t_s$. Let z satisfy $$\begin{cases} \frac{dz}{dt} = 0 \\ z(0) = t_s \end{cases} \quad (12)$$

Next, the embodiment introduce a new independent time variable $\tau$, a piecewise linear relationship between t and $\tau$ is established as $$t = \begin{cases} t_0 + (z - t_0)\tau, & 0 \leq \tau \leq 1 \\ z + (t_f - z)(\tau - 1), & 1 \leq \tau \leq 2 \end{cases}, \quad (13)$$

then for r∈[0,1], dynamics of the multi-motor control system is given by $$\begin{cases} \frac{dx_1(\tau)}{d\tau} = (z-t_0)x_2(\tau), x_1(0) = 0 \\ \frac{dx_2(\tau)}{d\tau} = (z-t_0)[d_x x_2(\tau) + b_x u_x(\tau)], x_2(0) = 0 \\ \frac{dy_1(\tau)}{d\tau} = (z-t_0)y_2(\tau), y_1(0) = 0 \\ \frac{dy_2(\tau)}{d\tau} = (z-t_0)[d_y y_2(\tau) + b_y u_y(\tau)], y_2(0) = 0 \\ \frac{dz(\tau)}{d\tau} = 0, z(0) = t_s \end{cases} \quad (14)$$

while constraints on the velocity, acceleration and the control inputs are given by $$\begin{cases} 0 \le x_2(\tau) \le v_{max}^x, 0 \le y_2(\tau) \le v_{max}^y, \\ |\dot{x}_2(\tau)| \le a_{max}^x, |\dot{y}_2(\tau)| \le a_{max}^y, \\ |u_x(\tau)| \le u_{max}, |u_y(\tau)| \le u_{max} \\ y_1(\tau) \le E_y \end{cases} \quad (15)$$

and for r∈[1,2], dynamics of the multi-motor control system is given by $$\begin{cases} \frac{dx_1(\tau)}{d\tau} = (t_f - z)x_2(\tau), x_1(2) = D_x \\ \frac{dx_2(\tau)}{d\tau} = (t_f - z)[d_x x_2(\tau) + b_x u_x(\tau)], x_2(2) = 0 \\ \frac{dy_1(\tau)}{d\tau} = (t_f - z)y_2(\tau), y_1(2) = D_y \\ \frac{dy_2(\tau)}{d\tau} = (t_f - z)[d_y y_2(\tau) + b_y u_y(\tau)], y_2(2) = 0 \\ \frac{dz(\tau)}{d\tau} = 0 \end{cases} \quad (16)$$

while constraints on the velocity, acceleration and the control inputs are given by $$\begin{cases} 0 \le x_2(\tau) \le v_{max}^x, 0 \le y_2(\tau) \le v_{max}^y, \\ |\dot{x}_2(\tau)| \le a_{max}^x, |\dot{y}_2(\tau)| \le a_{max}^y, \\ |u_x(\tau)| \le u_{max}, |u_y(\tau)| \le u_{max} \\ x_1(\tau) \ge D_x - E_x \end{cases} \quad (17)$$

the original cost function J shown in (3) now becomes $$\bar{J} = \bar{J}_1 + \bar{J}_2 \quad (18)$$

$$= \int_0^1 (z-t_0)(R_x u_x^2 + R_y u_y^2 + K_x x_2 u_x + K_y y_2 u_y)d\tau +$$
$$\int_1^2 (t_f - z)(R_x u_x^2 + R_y u_x^2 + K_x x_2 u_x + K_y y_2 u_y)d\tau,$$

and Augmented optimal control problem now becomes to find $z(\tau)$ and $U(\tau) = [u_x(\tau), u_y(\tau)]^T$, r∈[0,2] such that the cost function (18) is minimized.

In one embodiment, the derivation of accurate numerical value of the gradient $$\frac{\partial \bar{J}}{\partial z}$$

with respect to the switch time is given by the following steps. Let $L(\tau) = R_x u_x^2(\tau) + R_y u_y^2(\tau) + K_x x_2(\tau) u_x(\tau) + K_y y_2(\tau) u_y(\tau)$, then we have $$\frac{\partial \bar{J}}{\partial z} = \frac{\partial \bar{J}_1}{\partial z} + \frac{\partial \bar{J}_2}{\partial z} \quad (19)$$

$$= \int_0^1 \left\{ L + (z-t_0)\left[\left(\frac{\partial L}{\partial X}\right)^T \frac{\partial X}{\partial z} + \left(\frac{\partial L}{\partial U}\right)^T \frac{\partial U}{\partial z}\right] \right\} d\tau +$$
$$\int_1^2 \left\{ -L + (t_f - z)\left[\left(\frac{\partial L}{\partial X}\right)^T \frac{\partial X}{\partial z} + \left(\frac{\partial L}{\partial U}\right)^T \frac{\partial U}{\partial z}\right] \right\} d\tau,$$

where $$\left(\frac{\partial L}{\partial X}\right)^T \frac{\partial X}{\partial z} = K_x u_x \frac{\partial x_2}{\partial x} + K_y u_y \frac{\partial y_2}{\partial z}, \quad (20)$$

$$\left(\frac{\partial L}{\partial U}\right)^T \frac{\partial U}{\partial z} = (2R_x u_x + K_x u_2)\frac{\partial u_x}{\partial z} + (2R_y u_y + K_y y_2)\frac{\partial u_y}{\partial z},$$

so we need to know $$\frac{\partial x_2}{\partial z}, \frac{\partial y_2}{\partial z}, \frac{\partial u_x}{\partial z} \text{ and } \frac{\partial u_y}{\partial z}$$

in order to get $$\frac{\partial \bar{J}}{\partial z}.$$

For r∈[0,1], we have $$\frac{\partial}{\partial \tau}\left(\frac{\partial x_2}{\partial z}\right) = \frac{\partial}{\partial z}\left(\frac{\partial x_2}{\partial \tau}\right) \quad (21)$$

$$= \frac{\partial}{\partial z}((z-t_0)(d_x x_2 + b_x u_x))$$

$$= d_x x_2 + b_x u_x + (z-t_0)d_x \frac{\partial x_2}{\partial z} + (z-t_0)b_x \frac{\partial u_x}{\partial z}$$

$$\frac{\partial}{\partial \tau}\left(\frac{\partial y_2}{\partial z}\right) = \frac{\partial}{\partial z}\left(\frac{\partial y_2}{\partial \tau}\right)$$

$$= \frac{\partial}{\partial z}((z-t_0)(d_y y_2 + b_y u_y))$$

$$= d_y y_2 + b_y u_y + (z-t_0)d_y \frac{\partial y_2}{\partial z} + (z-t_0)b_y \frac{\partial u_y}{\partial z},$$

where $\frac{\partial u_x}{\partial z}$ can be obtained via $$\begin{cases} \frac{\partial \bar{J}_1}{\partial u_x} = \int_0^1 (z-t_0)(2R_x u_x + K_x x_2)d\tau = 0 \\ \frac{\partial}{\partial z}\frac{\partial \bar{J}_1}{\partial u_x} = 0 \end{cases}, \quad (22)$$

which yields $$\frac{\partial u_x}{\partial z} = \frac{1}{2R_x}\left(-\frac{2R_x u_x + K_x x_2}{z - t_0} - K_x \frac{\partial x_2}{\partial z}\right), \quad (23)$$

similarly we can get $$\frac{\partial u_y}{\partial z} = \frac{1}{2R_y}\left(-\frac{2R_y u_y + K_y y_2}{z - t_0} - K_y \frac{\partial y_2}{\partial z}\right), \quad (24)$$

thus, through (21)-(24), we can get the numerical value of $$\frac{\partial \bar{J}_1}{\partial z}.$$

For $r \in [1,2]$, we have $$\frac{\partial}{\partial \tau}\left(\frac{\partial x_2}{\partial z}\right) = \frac{\partial}{\partial z}\left(\frac{\partial x_2}{\partial \tau}\right) \quad (25)$$

$$= \frac{\partial}{\partial z}((t_f - z)(d_x x_2 + b_x u_x))$$

$$= -d_x x_2 - b_x u_x + (t_f - z)d_x \frac{\partial x_2}{\partial z} + (t_f - z)b_x \frac{\partial u_x}{\partial z}$$

$$\frac{\partial}{\partial \tau}\left(\frac{\partial y_2}{\partial z}\right) = \frac{\partial}{\partial z}\left(\frac{\partial y_2}{\partial \tau}\right)$$

$$= \frac{\partial}{\partial z}((t_f - z)(d_y y_2 + b_y u_y))$$

$$= -d_y y_2 - b_y u_y + (t_f - z)d_y \frac{\partial y_2}{\partial z} + (t_f - z)b_y \frac{\partial u_y}{\partial z},$$

where $\frac{\partial u_x}{\partial z}$ can be obtained via $$\begin{cases} \frac{\partial \bar{J}_2}{\partial u_x} = \int_1^2 (t_f - z)(2R_x u_x + K_x x_2)d\tau = 0 \\ \frac{\partial}{\partial z}\frac{\partial \bar{J}_1}{\partial u_x} = 0 \end{cases} \quad (26)$$

which yields $$\frac{\partial u_x}{\partial z} = \frac{1}{2R_x}\left(\frac{2R_x u_x + K_x x_2}{t_f - z} - K_x \frac{\partial x_2}{\partial z}\right), \quad (27)$$

similarly we can get $$\frac{\partial u_y}{\partial z} = \frac{1}{2R_y}\left(\frac{2R_y u_y + K_y y_2}{t_f - z} - K_y \frac{\partial y_2}{\partial z}\right), \quad (28)$$

thus, through (25)-(28), called sensitivity equations, we can get the numerical value of $$\frac{\partial \bar{J}_2}{\partial z}, \frac{\partial \bar{J}}{\partial z}$$

is ready to be obtained through the calculations of $$\frac{\partial J_1}{\partial z} \text{ and } \frac{\partial J_2}{\partial z}.$$

Multiple Switching Times

Figure 5A:
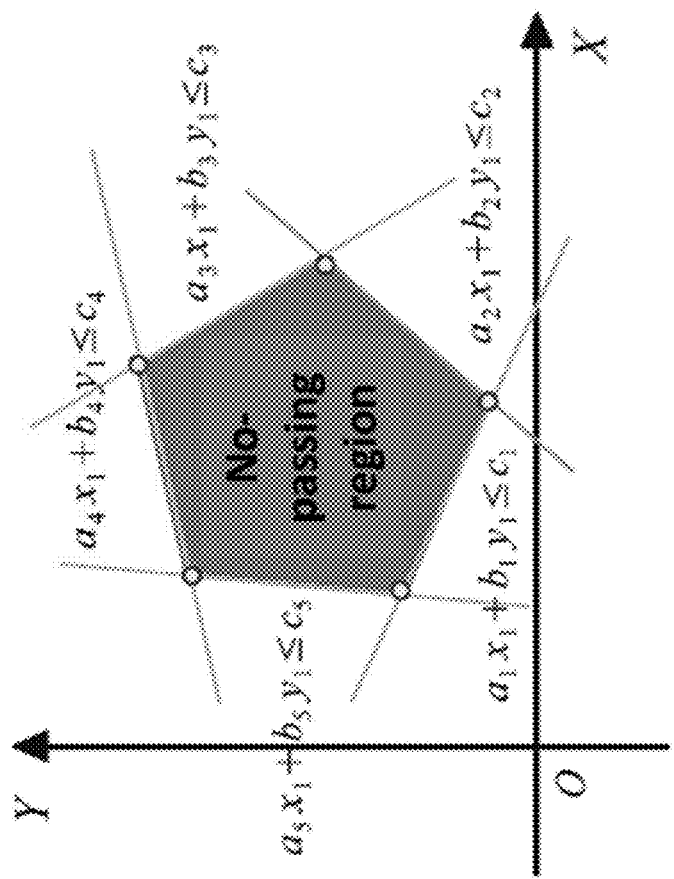
FIG. 5A is an exemplary scenario with multiple switching times.

FIG. 5 shows an embodiment with the obstacle described by a polyhedron in the 2D plan. This embodiment uses multiple switching times, i.e., the admissible regions for the multi-motor control system can be divided as $$\begin{cases} a_1 x_1 + b_1 y_1 \le c_1 & (\text{for } t \in [0, t_{s_1})) \\ a_2 x_1 + b_2 y_1 \le c_2 & (\text{for } t \in [t_{s_2}, t_{s_3})) \\ a_3 x_1 + b_3 y_1 \le c_3 & (\text{for } t \in [t_{s_3}, t_{s_4})), \\ \vdots \\ a_K x_1 + b_K y_1 \le c_K & (\text{for } t \in [t_{s_K}, t_f)) \end{cases} \quad (29)$$

where $a_i, b_i, c_i \in R$, for $i=1, 2, \ldots, K$.

The embodiment transforms the problem into an equivalent problem in $r \in [0, K+1]$ where K denotes the total number of switches and uses the two-stages decomposition method disclosed above, using the following steps 1. Set the iteration index $j=0$, choose an initial $t_s^j = [t_{s_1}^j, t_{s_2}^j, \ldots, t_{s_K}^j]$.
2. By solving an optimal control problem (i.e., Stage 1), calculate $J(t_s^j)$.
3. Calculate $$\left.\frac{\partial J}{\partial t_s}\right|_{t_s^j} = \left[\frac{\partial J}{\partial t_{s_1}^j}, \frac{\partial J}{\partial t_{s_2}^j}, \ldots, \frac{\partial J}{\partial t_{s_K}^j}\right].$$

4. Use some feasible direction method to update it to be $t_s^j$ to be $t_s^{j+1} = t_s^j + \alpha^j dt_s^j$ (here $dt_s^j$ is formed by using the gradient information of J with respect to $t_s$; the step size $\alpha^j$ can be chosen using some step size rule). Set the iteration index $j=j+1$.
5. Repeat step 2)-4) until a prescribed termination condition is satisfied.

Figure 5B:
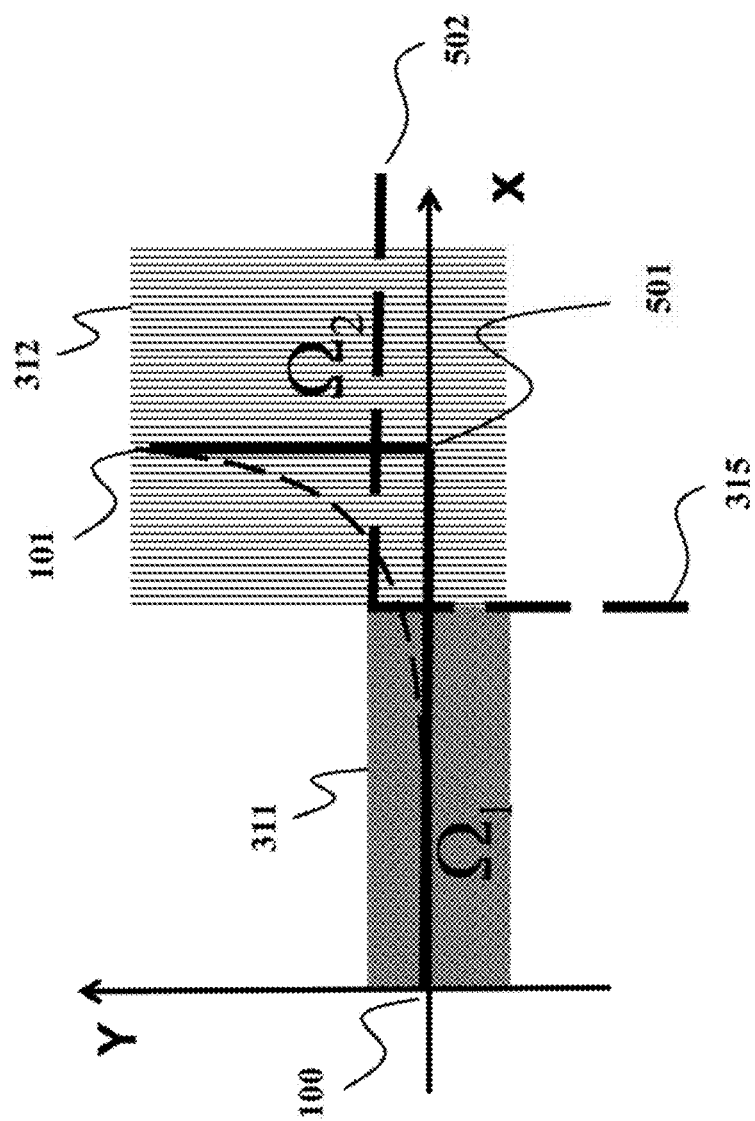
FIG. 5B is schematics of determining bounds of certain decision variables according to some embodiment of the invention.

FIG. 5B shows a schematic of determining bounds of certain decision variables according to some embodiment of this invention. The decision variable, switching time, is bounded by an upper bound and a lower bound estimated from a set of feasible trajectories avoiding the obstacle. The feasible trajectories can be obtained by solving the time optimal trajectory planning problems for a class of feasible paths. For instance, as shown in FIG. 5B, a feasible path is described by two straight lines: from a point 100 to a point 501, and from the point 501 to a point 101. Solving the time optimal trajectory Tr1 with the initial point 100 and the final point 501 gives a shortest time for the multi-motor control system moving from the point 100 to the point 501. The time instant when the time optimal trajectory Tr1 passes by the line 315 is the lower bound of the decision variable: the switching time. Solving the time optimal trajectory Tr2 with the initial point 101 and the final point 501 produces a shortest time for the multi-motor control system moving from point 101 to point 501.

The final time for the original optimal control problem, denoted by tf, minus the time instant when the time optimal trajectory Tr2 passes by the line 502, produces the upper bound of the decision variable: the switch time. Various types of feasible trajectories can be used to approximate the upper and lower bounds of the switching times decision variables. These feasible trajectories can be obtained by solving a mixed integer programming problem with coarse discretization of time thus reduced number of binary variables but with different cost functions.

Energy Model of the Multi-Motor Control System

Generally, the gross energy consumption of the multi-motor control system having a model according to Equation (2) includes copper losses, switching losses of an amplifier, and a mechanical work required for the movement. The copper losses are due to the flow of current through the windings of the motor and can be defined according to $$R_x u_x^2 + R_y u_y^2,$$

where $R_x$, $R_y$ are the resistances of windings of the motors and are usually supplied by a manufacture of the motor. The losses in the amplifier, e.g., a pulse-width-modulation amplifier, include switching losses, conduction losses, and gate drive losses. For example, the switching losses can be determined according to $$K_{sx}|u_x| + K_{sy}|u_y|,$$

where $K_{sx}$, $K_{sy}$ are constant coefficients.

The mechanical work can be modeled according to $$K_x x_2 u_x + K_y y_2 u_y,$$

where $K_x$, $K_y$ are the torque constants of the motors. The torque constant is usually supplied by the manufacturer of the motor or can be established from the specifications of the motor.

Hence, one embodiment of the invention describes methods to minimize the energy consumption of the motion control system according to the following power consumption model $$P(X,U) = R_x u_x^2 + R_y u_y^2 + K_x x_2 u_x + K_y y_2 u_y,$$

Some embodiments of the invention consider the energy flow constraint to determine the energy consumption model. For example, when $P(X,U) > 0$, the motion control system takes the energy from the utility grid. On the other hand, the mechanical work can be converted into electric energy by the motor and the electric energy can flow back to the grid or be dissipated by the brake chopper. One embodiment uses the energy flow constraint requiring the brake chopper to dissipate the generated power $P(x,u)$, and leads to the following energy consumption model $$J = \int_0^{t_f} \max(0, R_x u_x^2 + R_y u_y^2 + K_x x_2 u_x + K_y y_2 u_y) dt,$$

Alternative embodiment allows the electric energy generated by the motion control system to flow back to the utility grid, and results in the following energy consumption model $$J = \int_0^{t_f} (R_x u_x^2 + R_y u_y^2 + K_x x_2 u_x + K_y y_2 u_y) dt,$$

The establishment of an energy consumption model, which aims to accurately capture the characteristics of the actual energy consumption of a motion control system, is critical to implement an energy efficient motion control system.

In some embodiments, the energy model is modified according to variation in implementations of the motion control system. For example, the energy consumption of a small scale motion control system can be approximated based on only the resistive loss. In this embodiment, the energy model can be represented as a quadratic function of control $$J = \int_0^{t_f} (R_u u_x^2 + R_y u_y^2) dt,$$

After the energy model and the cost function are defined, the embodiments minimize the cost function, subject to various constraints, to determine the energy-efficient trajectory. Consequently, the trajectory generated by minimizing a cost function is necessary for an energy efficient motion control system. In some embodiments, when the cost function and the constraints exactly depict the properties of a motion control system, an energy optimal motion control system can be resulted by combining appropriate hardware. The cost function can be used to make the tradeoff between energy consumption and tracking time. For example, in one embodiment, the cost function is defined by $$J = \int_0^T (R_x u_x^2 + R_y u_y^2) dt.$$

Thus, the trade-off between the energy consumption and the tracking time is achieved by varying the tracking time T, which can be specified by a user through a user interface.

In alternative embodiment, the cost function is determined as $$J = \int_0^T (\epsilon + R_x u_x^2 + R_y u_y^2 + K_x x_2 u_x + K_y y_2 u_y) dt,$$

where the tracking time T is unspecified, and $\epsilon$ is a preference constant, which can be introduced by a user. A large value of the preference constant $\epsilon$ represents the importance of the tracking time of the operation of the motion control system, i.e., productivity of the system, over the energy efficiency. A small value of the preference constant $\epsilon$ means the opposite, i.e., reflects importance of the energy efficiency over the tracking time.

Energy Efficient Motion Control System Avoiding Obstacles

Figure 6A:
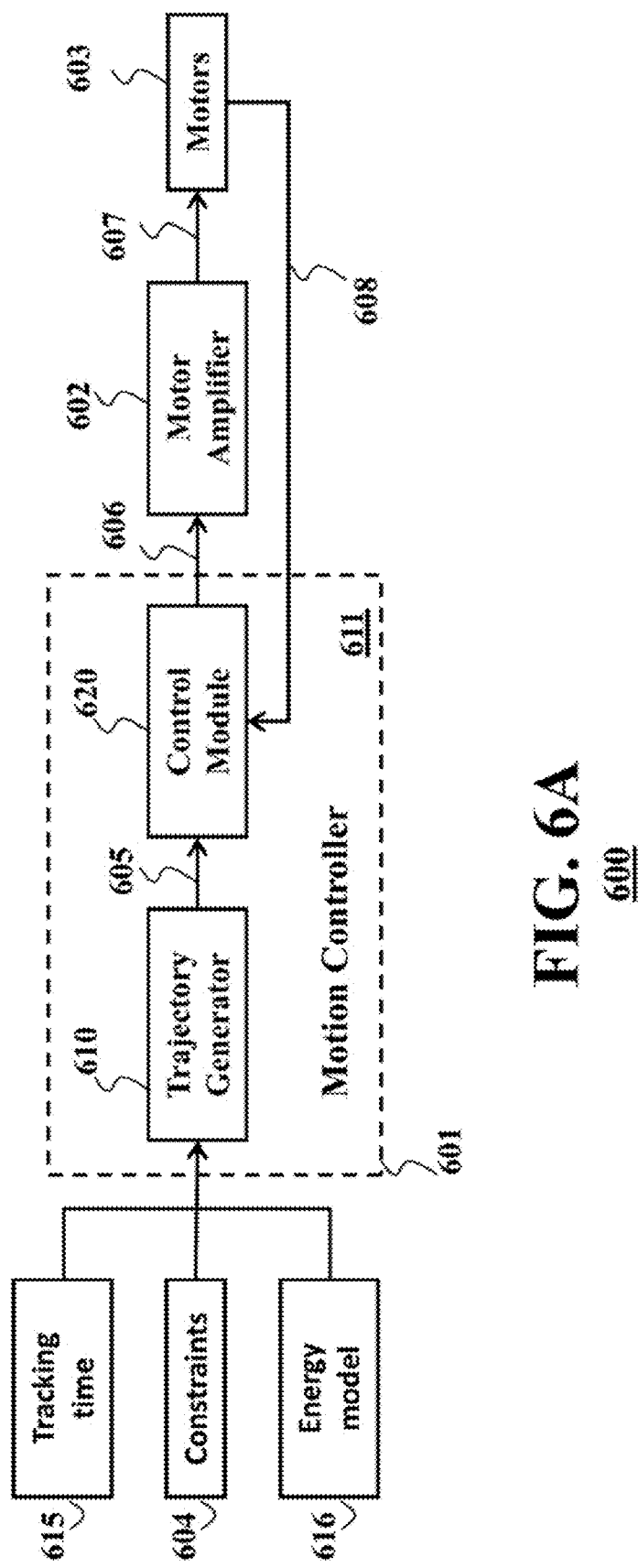
FIGS. 6A, 6B, and 6C are block diagrams of components of a multi-motor control system according to some embodiments of the invention.
Figure 6B:
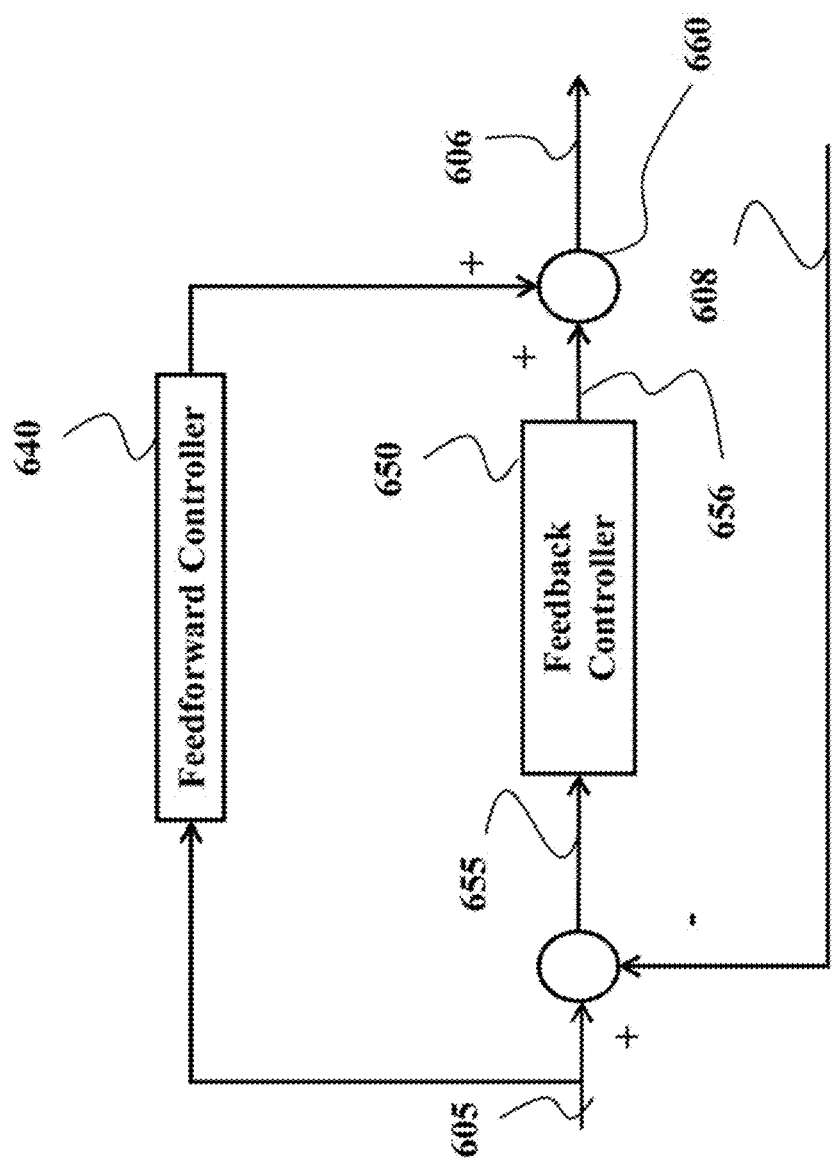
Figure 6C:
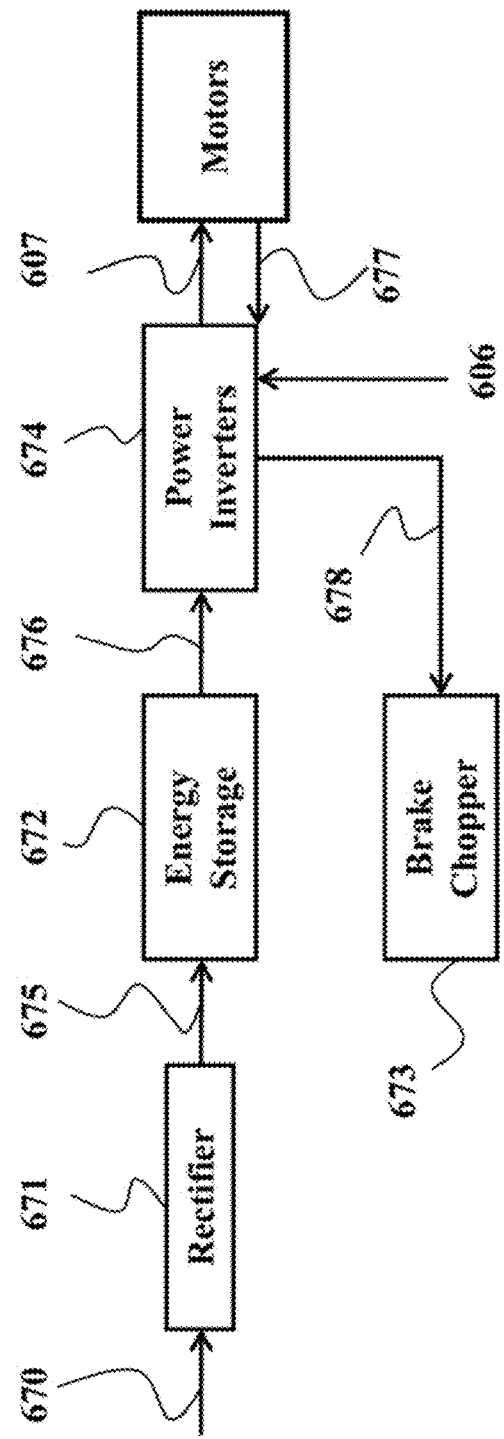

FIGS. 6A-6C shows block diagrams of a motion control system according to some embodiments of an invention. The motion control system can be configured to perform a single axis positioning task, or a multiple axes positioning tasks. An example of the motion control system is a servo system.

As shown in FIG. 6A, the energy efficient motion control system 600 includes one or combination of a motion controller 601, an amplifier 602, and a motor 603. The motion controller 601 can further include a trajectory generation module 610 and a control module 620. The trajectory generation module 610 receives constraints 604, including non-convex constraints, and the tracking time 615, and energy model 616 as inputs and outputs an energy efficient trajectory 605 of a motion of the motor of the motion control system to the control module 620. The energy efficient trajectory can include one or combination of a control trajectory of a current input to the motor, a position trajectory of a position of the motor, a velocity trajectory of a velocity of the motor, and an acceleration trajectory of an acceleration of the motor. Typically, the control, the position, the velocity, and the acceleration trajectories are equivalent to each other, because, given the initial state of the motor, every trajectory uniquely determines the other three trajectories through the dynamics of the motor. As referred herein, the energy efficient trajectory is one or combinations of abovementioned trajectories.

The trajectory generation module 610 determines the trajectory 605 by optimizing, e.g., minimizing a cost function subject to the constraints 604. The cost function is determined based on an energy model 616 of the system 600 and, optionally, a function of a tracking time 615, as described below. The motion controller can be implemented using a processor 611.

The control module 620 determines a control signal 606 based on the trajectory 605 and feedback signal 608, and outputs the control signal 606 to the amplifier 602 which determines and outputs a current or voltage input 607 to the motor 603. In one embodiment, the feedback signal 608 describes a current state of the motion control system. In another embodiment, the feedback signal 608 describes a motion of the motor 603. For example, in one variation of this embodiment, the feedback signal 608 is a position of the motor. In some embodiments, the control module 620 performs feedforward and/or feedback operation to determine the control signal 606.

FIG. 6B shows a block diagram of the control module 620 according to one embodiment of the invention. The control module 620 includes a feedforward controller 640 and a feedback controller 650. The feedforward controller takes the trajectory 605 as input, and a feedback controller takes an error signal 655 between the feedback signal 608 and the trajectory 605 to determine a correction signal 656. The control signal 606 is determined based on the trajectory 605 and the correction signal 656.

The embodiments shown in FIGS. 6A-6C are used for illustration purpose only, and are not intended to limit the scope of the invention. For example, in various embodiments, the command signal 605 or the control signal 606 are provided directly to the motor 603. In another embodiment, the control module is integrated into the amplifier 602, and the feedback signal 608 is fed into the amplifier.

FIG. 6C shows a block diagram of the amplifier according to one embodiment of the invention. A rectifier 671 rectifies a power supply 670 into DC current 675, which flows through an energy storage block 672. Power inverters 674 receive, from the energy storage block 672, the DC current 676 and generate AC currents 607 to drive motors. When a motor is decelerating, the motor generates energy and provides AC current 677 to a power inverter 674, which redirect the AC current 677 to a brake chopper 673 or to another power inverter 674 to drive another motor consuming energy. The brake chopper dissipates the power flow 678 from the power inverter 674. Signals 606 or 605 are used to control the power inverter such that it outputs the required current 607.

Figure 6D:
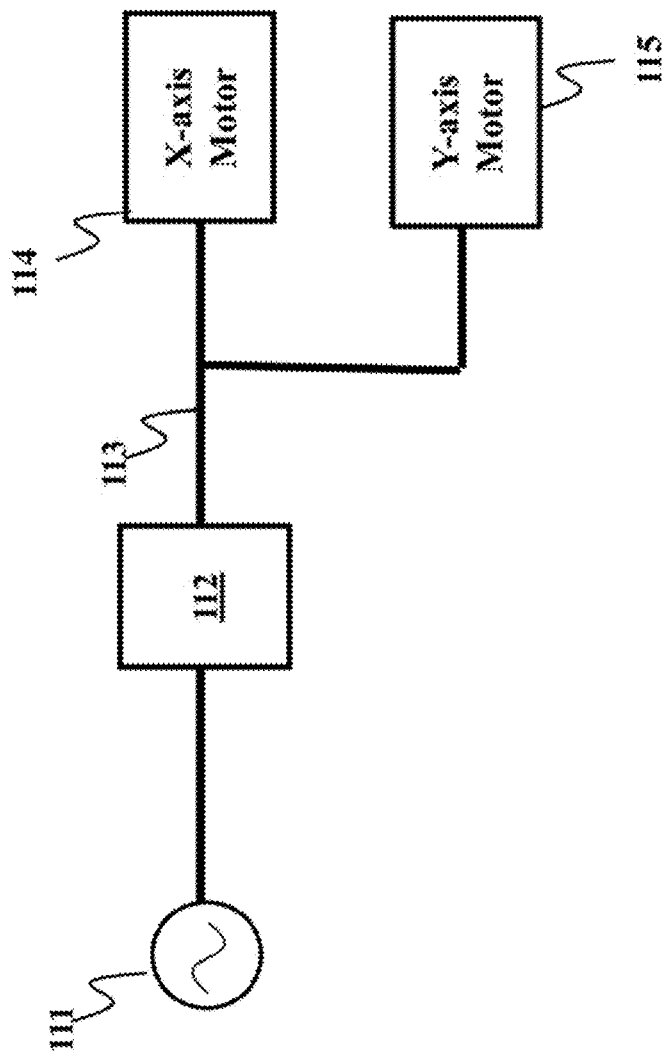
FIG. 6D is a block diagram of a power supply for multi-motor control system in FIG. 6A.

FIG. 6D shows a block diagram of the power supply for the motion control system in FIG. 6A, where one amplifier 112 is used to supply multiple motors.

Figure 6E:
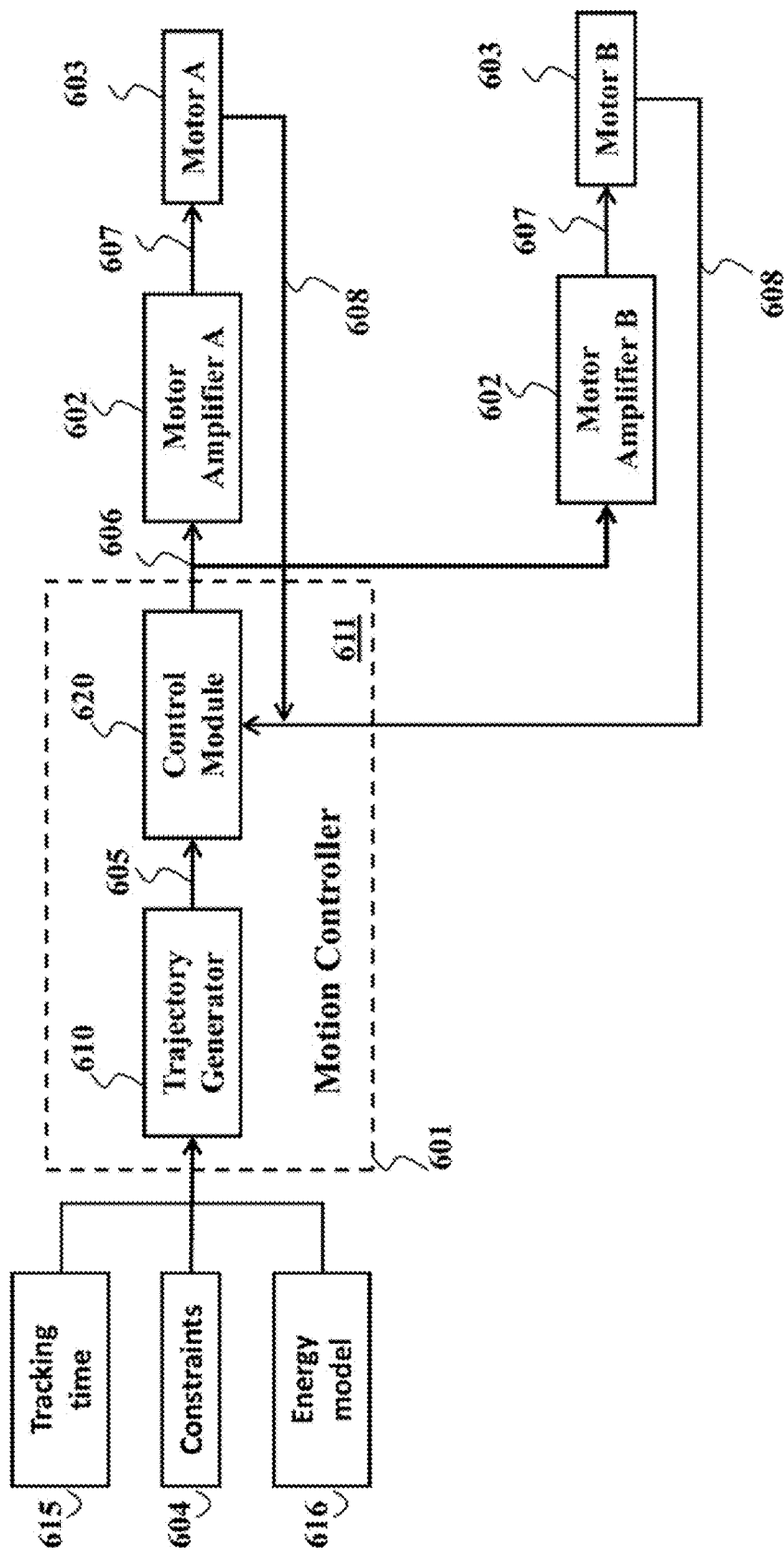
FIGS. 6E, 6F, and 6G are block diagrams of a multi-motor control system according to various embodiments of the invention.
Figure 6F:
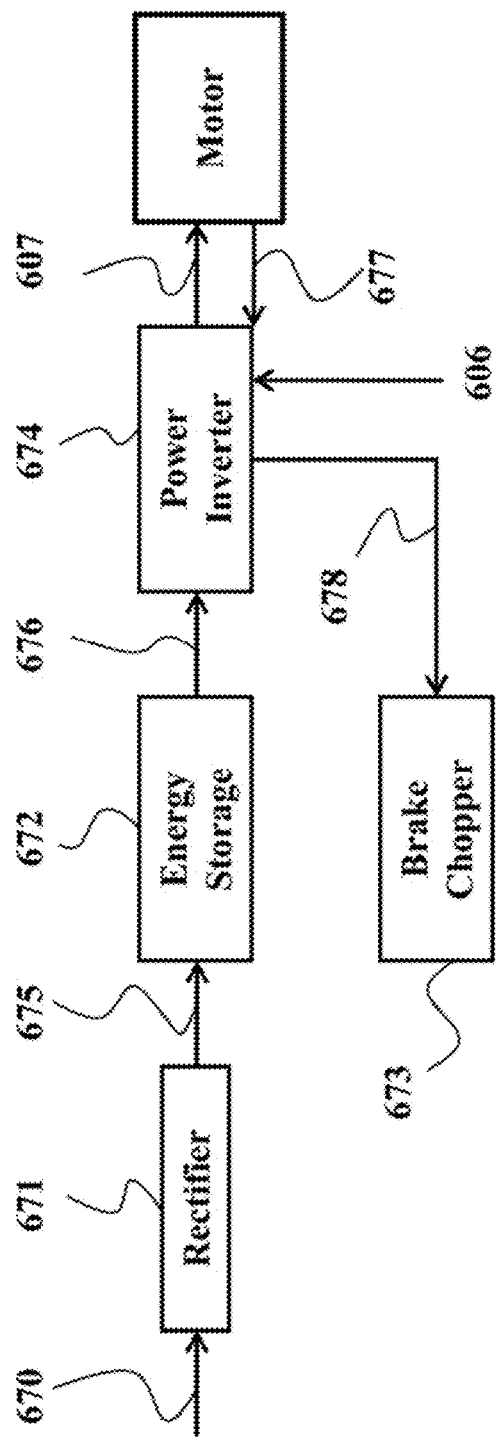
Figure 6G:
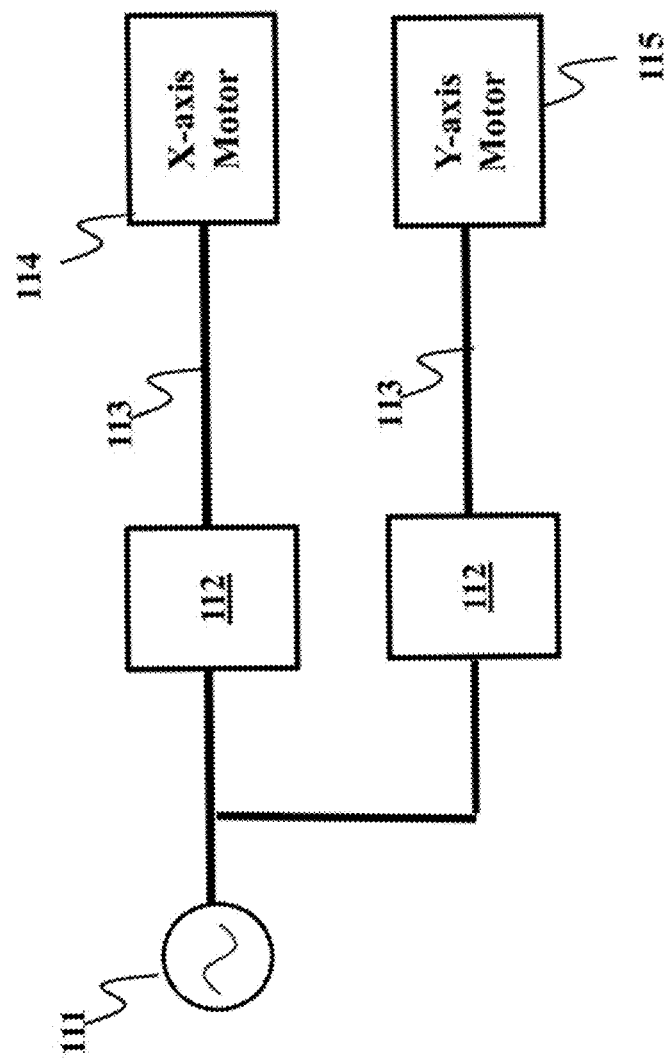

FIGS. 6E-6G shows block diagrams of a motion control system according to some embodiments of an invention. As shown in FIG. 6E, the energy efficient motion control system includes one or combination of a motion controller 601, amplifiers A/B 602, and motors A/B 603. The motion controller 601 can further include a trajectory generation module 610 and a control module 620. The trajectory generation module 610 receives constraints 604, including non-convex constraints, and the tracking time 615, and energy model 616 as inputs and outputs an energy efficient trajectory 605 of a motion of the motor of the motion control system to the control module 620. The control module 620 determines control signals 606, based on the measured signals 608 from motors A/B, as input signals of motor amplifiers A/B 602, which supply power to motors A/B, respectively.

FIG. 6F shows a block diagram of the amplifier, corresponding to the motion control system in FIG. 6E, according to one embodiment of the invention. A rectifier 671 rectifies a power supply 670 into DC current 675, which flows through an energy storage block 672. A power inverter 674 receives, from the energy storage block 672, the DC current 676 and generates AC currents 607 to a drive motor. When the motor generates energy, it provides AC current 677 to the power inverter 674, which redirect the AC current 677 to a brake chopper. The brake chopper dissipates the power flow 678 from the power inverter 674. Signals 606 or 605 are used to control the power inverter such that it outputs the required current 607. FIG. 6G shows a block diagram of the power supply for the motion control system in FIG. 6E, where one amplifier 112 is used to supply one motor.

The current disclosure describes the embodiments based on the cost function according to Equation (3). Its extension to different cost functions is straightforward to those skilled in the art.

Some embodiments of the invention consider physical limitation of a design of the motion control system. Typical motion control system is subject to a number of constraints, such as static and dynamic constraints. The static constraint includes an acceleration constraint, a velocity constraint, and an input current constraint of the motor. The dynamic constraint represents dynamics of the motor. The constraints include at least some of the static and the dynamic constraints, the non-convex spatial constraints, the tracking time, and an initial and a final state of the motor. The consideration of constraints in the trajectory generation can remove the limitations introduced by the ignorance of constraints in the design stage, thus improves the energy efficiency of a motion control system.

The above-described embodiments of the present invention can be implemented in any of numerous ways. For example, the embodiments may be implemented using hardware, software or a combination thereof. When implemented in software, the software code can be executed on any suitable processor or collection of processors, whether provided in a single computer or distributed among multiple computers. Such processors may be implemented as integrated circuits, with one or more processors in an integrated circuit component. Though, a processor may be implemented using circuitry in any suitable format.

Further, it should be appreciated that a computer may be embodied in any of a number of forms, such as a rack-mounted computer, a desktop computer, a laptop computer, minicomputer, or a tablet computer. Such computers may be interconnected by one or more networks in any suitable form, including as a local area network or a wide area network, such as an enterprise network or the Internet. Such networks may be based on any suitable technology and may operate according to any suitable protocol and may include wireless networks, wired networks or fiber optic networks.

Also, the various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, the invention may be embodied as a non-transitory computer-readable medium or multiple computer readable media, e.g., a computer memory, compact discs (CD), optical discs, digital video disks (DVD), magnetic tapes, and flash memories. The terms "program" or "software" are used herein in a generic sense to refer to any type of computer code or set of computer-executable instructions that can be employed to program a computer or other processor to implement various aspects of the present invention as discussed above.

Computer-executable instructions may be in many forms, such as program modules, executed by one or more computers or other devices. Generally, program modules include routines, programs, objects, components, data structures that perform particular tasks or implement particular abstract data types. Typically the functionality of the program modules may be combined or distributed as desired in various embodiments.

Also, the embodiments of the invention may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Although the invention has been described by way of examples of preferred embodiments, it is to be understood that various other adaptations and modifications can be made within the spirit and scope of the invention. Therefore, it is the object of the appended claims to cover all such variations and modifications as come within the true spirit and scope of the invention.

We claim:

1. A method for determining a trajectory for a multi-motor control system moving a mass, wherein the trajectory includes positions of the mass as a function of time, comprising:
   determining a cost function representing a movement of the mass by the multi-motor control system from an initial point to a final point, wherein an optimization of the cost function is subject to non-convex constraints due to avoidance of a region of the obstacle located between the initial point and the final point;
   determining a union of convex regions connecting the initial point with the final point, each convex region does not intersect the region of the obstacle;
   determining a convex constraint for each convex region to produce a set of convex constraints;
      determining a set of switching times when the trajectory crosses boundaries of the convex regions; and
   optimizing the cost function by jointly updating the positions and the set of switching times to produce an optimal trajectory of the movement, wherein the optimizing is subject to the set of convex constraints, such that each convex constraint is applied independently for each corresponding convex region, wherein steps of the method are performed by a processor; selecting, for each convex region in the union, the convex constraint of the convex region from the set of convex constraints based on a time of the movement and the set of switching times;
   optimizing, for each convex region in the union, the cost function subject to the convex constraint from the time of the movement defined by the switching times of the convex region;
   updating the set of the switching times; and
   repeating the selecting, the optimizing and the updating until a terminal condition is met.

2. The method of claim 1, wherein the union of convex regions includes a first convex region and a second convex region, and a switching time corresponds to a time when the trajectory crosses a boundary between the first and the second convex regions, wherein a convex constraint of the first convex region is applied during a period of time the trajectory is within the first convex region, and a convex constraint of the second convex region is applied during a period of time the trajectory is within the second convex region.

3. The method of claim 1, wherein the optimizing is performed iteratively until a gradient of the cost function with respect to the set of switch times is below a threshold.

4. The method of claim 1, further comprising:
   determining the convex constraints based on a feasible trajectory avoiding the obstacle;
      initializing the set of switching times based on the feasible trajectory;
   optimizing the cost function based on the initialized set of the switching times;
      updating the set of switching times based on a set of gradients of the cost function with respect to the set of switching times; and
      repeating the optimizing and the updating until each gradient is below a threshold.

5. The method of claim 4, further comprising:
   approximating the set of gradients based on a sensitivity equation.

6. The method of claim 5, wherein the approximating comprises:
   determining sensitivity equations according to the cost function, constraints, and time intervals specified by switching times, and
   solving an initial value problem of the sensitivity equations.

7. The method of claim 4, where the updating the set of switching times is bounded by an upper bound and a lower bound of the set of switching times estimated from a set of feasible trajectories avoiding the obstacle.

8. The method of claim 7, where the updating set of switching times includes selecting the switching times from a finite set of values satisfying the upper and lower bounds of switch times.

9. The method of claim 7, further comprising:
   determining the set of feasible trajectories by optimizing a shortest moving time cost function or a quadratic function of decision variables.

10. The method of claim 1, wherein the cost function includes an energy consumption of the multi-motor control system moving the mass according the trajectory.

11. The method of claim 1, wherein the movement of the mass is subject to acceleration and velocity constraints of the multi-motor control system, such that the cost function is optimized subject to the acceleration and the velocity constraints.

12. A motion controller for controlling a multi-motor control system moving a mass according to a trajectory defining positions of the mass as a function of time from an initial point to a final point, such that the mass avoids at least one obstacle, wherein the multi-motor control system includes at least two motors for moving the mass into at least two directions, the controller comprising:
   a trajectory generator module for determining a union of convex regions connecting the initial point with the final point, each convex region does not intersect a region of the obstacle, and for optimizing a cost function representing a movement of the mass by the multi-motor control system subject to a set of convex constraints to determine the trajectory, wherein each convex constraint corresponds to a convex region of the union, and wherein the optimizing applies each convex constraint independently for each corresponding convex region; and
   a control module for generating a control signal to control the motors of the multi-motor control system according to the trajectory; determining a convex constraint for each convex region to produce the set of convex constraint and a set of switching times for crossing boundaries of the convex regions; and for optimizing jointly the cost function and the set of switching times, wherein the optimizing jointly comprises:
   selecting, for each convex region in the union, the convex constraint of the convex region from the set of convex constraints based on a time of the movement and the set of switching times;
   optimizing, for each convex region in the union, the cost function subject to the convex constraint for the time of the movement defined by the convex region;
   updating the set of the switching limes; and
   repeating the selecting, the optimizing and the updating until a gradient of the cost function with respect to the set: of switch times is below a threshold.

13. The motion controller of claim 12, wherein the processor is configured for
   determining the convex constraints based on a feasible trajectory avoiding the obstacle;

initializing the set of switching times based on the feasible trajectory;

optimizing the cost function based on the initialized set of the switching times to update the trajectory;

updating the set of switching times based on a set of gradients of the cost function with respect to the set of switching times; and repeating the optimizing and the updating until each gradient is below a threshold.

14. The motion controller of claim 13, wherein the set of switching times is bounded by an upper bound and a lower bound, and the processor selects the switching times from a finite set of values satisfying the upper and lower bounds of switch times.

15. The motion controller of claim 12, wherein the cost function includes an energy consumption of the motors moving the mass according the trajectory.

16. A multi-motor control system for moving a mass according a trajectory, comprising:

at least two motors for moving the mass into at least two directions;

a motion controller for determining the trajectory defining positions of the mass as a function of time from an initial point to a final point, such that the mass avoids at least one obstacle, the motion controller comprising:

a trajectory generator module for determining a union of convex regions connecting the initial point with the final point, each convex region does not intersect a region of the obstacle, and for optimizing a cost function representing a movement of the mass by the multi-motor control system subject to a set of convex constraints to determine the trajectory, wherein each convex constraint corresponds to a convex region of the union, and wherein the optimizing applies each convex constraint independently for each corresponding convex region; and a control module for generating a control signal to control the motors of the multi-motor control system according to the trajectory; and an amplifier for providing energy to the motors according to the control signal; selecting, for each convex region in the union, the convex constraint of the convex region from the set of convex constraints based on a time of the movement and the set of switching times;

optimizing, for each convex region in the union, the cost function subject to the convex constraint for the time of the movement defined by the convex region;

updating the set of the switching limes; and repeating the selecting, the optimizing and the updating until a gradient of the cost function with respect to the set of switch times is below a threshold.

17. The multi-motor control system of claim 16, further comprising:

at least two amplifiers independently providing the energy to each motor.

18. The multi-motor control system of claim 16, wherein the cost function includes electric and mechanical losses of the motors.

* * * * *